US012731332B2

(12) United States Patent
Fleischman et al.

(10) Patent No.: US 12,731,332 B2
(45) **Date of Patent: *Sep. 8, 2026**

(54) MACHINE LEARNING BASED OBJECT IDENTIFICATION USING SCALED DIAGRAM AND THREE-DIMENSIONAL MODEL

(71) Applicant: Open Space Labs, inc., San Francisco, CA (US)

(72) Inventors: Michael Ben Fleischman, San Francisco, CA (US); Gabriel Hein, Albany, CA (US); Thomas Friel Allen, El Cerrito, CA (US); Abraham Botros, San Francisco, CA (US)

(73) Assignee: Open Space Labs, Inc., San Francisco, CA (US)

(*) Notice: Subject to any disclaimer, the term of this patent is extended or adjusted under 35 U.S.C. 154(b) by 204 days.

This patent is subject to a terminal disclaimer.

(21) Appl. No.: 18/754,477

(22) Filed: Jun. 26, 2024

(65) Prior Publication Data

US 2024/0346756 A1 Oct. 17, 2024

Related U.S. Application Data

(63) Continuation of application No. 18/346,012, filed on Jun. 30, 2023, now Pat. No. 12,045,936, which is a (Continued)

(51) Int. Cl.

*G06T 19/00* (2011.01)
*G01S 17/89* (2020.01)

(Continued)

(52) U.S. Cl.

CPC .............. *G06T 17/00* (2013.01); *G01S 17/89* (2013.01); *G06F 18/214* (2023.01); *G06F 18/24* (2023.01);

(Continued)

(58) Field of Classification Search

None

See application file for complete search history.

(56) References Cited

U.S. PATENT DOCUMENTS 8,270,767 B2 9/2012 Park
9,990,760 B2 6/2018 Aguilera Perez et al.

(Continued)

FOREIGN PATENT DOCUMENTS

JP 2007310572 A 11/2007
JP 2009507295 A 2/2009

(Continued)

OTHER PUBLICATIONS

European Patent Office, Extended European Search Report and Written Opinion, European Patent Application No. 21812782.7, Apr. 9, 2024, 11 pages.

(Continued)

*Primary Examiner* — Martin Mushambo
(74) *Attorney, Agent, or Firm* — Fenwick & West LLP

(57) ABSTRACT

A system automatically identifies objects in an environment based on a walkthrough video and an annotated floorplan of the environment. The annotated floorplan indicates locations and types of objects that are expected to be in the environment. The system receives the walkthrough video and generates a 3D model of the environment. The system applies a machine learning model to the walkthrough video to identify regions within frames where objects are captured. After identifying the regions within frames of the walkthrough video that include objects, the system modifies corresponding regions of the 3D model to include the identified objects. For each of the identified objects, the system determines a likelihood of the identified object being present at a location in the environment based on a comparison of the modified 3D model and the annotated floorplan.

17 Claims, 20 Drawing Sheets

Related U.S. Application Data continuation of application No. 17/875,388, filed on Jul. 27, 2022, now Pat. No. 11,734,882, which is a continuation of application No. 17/225,802, filed on Apr. 8, 2021, now Pat. No. 11,436,812.

(60) Provisional application No. 63/032,452, filed on May 29, 2020.

(51) Int. Cl.

| | |
|---|---|
| ***G06F 18/214*** | (2023.01) |
| ***G06F 18/24*** | (2023.01) |
| ***G06N 20/00*** | (2019.01) |
| ***G06T 7/11*** | (2017.01) |
| ***G06T 7/70*** | (2017.01) |
| ***G06T 17/00*** | (2006.01) |
| ***G06T 17/05*** | (2011.01) |
| ***G06T 19/20*** | (2011.01) |
| ***G06V 20/40*** | (2022.01) |
| ***G06V 20/56*** | (2022.01) |
| ***G06V 30/262*** | (2022.01) |

(52) U.S. Cl.

CPC ................ *G06N 20/00* (2019.01); *G06T 7/11* (2017.01); *G06T 7/70* (2017.01); *G06T 17/05* (2013.01); *G06T 19/20* (2013.01); *G06V 20/41* (2022.01); *G06V 20/56* (2022.01); *G06V 30/274* (2022.01); *G06T 2200/24* (2013.01); *G06T 2207/10016* (2013.01); *G06T 2207/20081* (2013.01); *G06T 2219/2004* (2013.01)

(56) References Cited

U.S. PATENT DOCUMENTS

| | | | | |
|---|---|---|---|---|
| 10,127,721 | B2 | 11/2018 | Upendran et al. | |
| 10,139,985 | B2 | 11/2018 | Mildrew et al. | |
| 10,163,271 | B1 | 12/2018 | Powers et al. | |
| 10,792,557 | B1 | 10/2020 | Kasbar | |
| 2007/0092110 | A1 | 4/2007 | Xu et al. | |
| 2008/0069480 | A1 | 3/2008 | Aarabi et al. | |
| 2011/0261049 | A1 | 10/2011 | Cardno et al. | |
| 2012/0194644 | A1 | 8/2012 | Newcombe et al. | |
| 2014/0043436 | A1 | 2/2014 | Bell et al. | |
| 2014/0125770 | A1 | 5/2014 | Bell et al. | |
| 2014/0288890 | A1 | 9/2014 | Khainson et al. | |
| 2014/0320661 | A1 | 10/2014 | Sankar et al. | |
| 2015/0248916 | A1 | 9/2015 | Kopf et al. | |
| 2016/0148433 | A1 | 5/2016 | Petrovskaya et al. | |
| 2016/0305785 | A1 | 10/2016 | Nishijima et al. | |
| 2017/0018086 | A1 | 1/2017 | Zhang | |
| 2017/0053171 | A1 | 2/2017 | Buehler | |
| 2017/0094165 | A1 | 3/2017 | Meadow et al. | |
| 2018/0012125 | A1 | 1/2018 | Ladha et al. | |
| 2018/0075168 | A1 | 3/2018 | Tiwari et al. | |
| 2019/0005719 | A1 | 1/2019 | Fleischman et al. | |
| 2019/0243928 | A1 * | 8/2019 | Rejeb Sfar | G06V 30/422 |
| 2019/0304150 | A1 | 10/2019 | Zweigle et al. | |
| 2020/0074668 | A1 | 3/2020 | Stenger et al. | |
| 2020/0210774 | A1 | 7/2020 | Jakubowicz | |

FOREIGN PATENT DOCUMENTS

| | | |
|---|---|---|
| JP | 2019149148 A | 9/2019 |
| JP | 2020038657 A | 3/2020 |

OTHER PUBLICATIONS

Huang, B. et al. "Floor Plan Based Indoor Vision Navigation Using Smart Device," Master's Thesis, University of Calgary, Jul. 10, 2013, 107 pages.

Lin, C. et al. "An integrated 3D mapping approach based on RGB-D for a multi-robot system," IEEE/SICE International Symposium on System Integration, Dec. 13, 2014, pp. 143-146.

PCT International Search Report and Written Opinion, PCT Application No. PCT/US18/40123, dated Sep. 6, 2018, 14 pages.

PCT International Search Report and Written Opinion, PCT Application No. PCT/US21/28026, Jul. 20, 2021, 20 pages.

Pomerleau, F. et al. "Long-term 3D map maintenance in dynamic environments," IEEE International Conference on Robotics and Automation, May 31, 2014, 8 pages.

United States Office Action, U.S. Appl. No. 17/225,802, filed Apr. 14, 2022, 27 pages.

United States Office Action, U.S. Appl. No. 17/875,388, filed Jan. 20, 2023, 15 pages.

United States Office Action, U.S. Appl. No. 18/346,012, filed Feb. 29, 2024, eight pages.

* cited by examiner

3D Model 266
360° Frames 212
Annotated 3D Model Generation Module 146
Object Identifier Module 274
Classified Frames 276
3D Model Annotation Module 278
Annotated 3D Model 280
Floorplan 257
Floorplan 257
Quantity Estimation Module 148
Expected Quantity Determination Module 144
Estimated Quantity
Expected Quantity
Progress Determination Module 150

400

Project Progress

HT ?

View

Progress as of Aug 12, 2020

Display Status % Complete Quantities

Filters

Export CSV

| | | | Wall | | | | |
|---|---|---|---|---|---|---|---|
| Sheet | Last capture | Tracking status | Layout | Framing | Insulation | Drywall | Taping |
| Entire Project | Aug 1, 2020 | Complete: 4 In Progress: 4 Not Started: 2 | 47,800 / 100,000 LF Installed | 54,360 / 90,000 LF Installed | 23,280 / 40,000 SF Installed | 49,950 / 90,000 LF Installed | 31,850 / 70, Installed |
| Level 1 | May 13, 2020 | COMPLETE | 10,000 / 10,000 LF | 9,000 / 9,000 LF | 4,000 / 4,000 SF | 9,000 / 9,000 SF | 7,000 / 7,00 |
| Level 2 | Jun 20, 2020 | COMPLETE | 10,000 / 10,000 LF | 9,000 / 9,000 LF | 4,000 / 4,000 SF | 9,000 / 9,000 SF | 7,000 / 7,00 |
| Level 3 | Jul 11, 2020 | COMPLETE | 10,000 / 10,000 LF | 9,000 / 9,000 LF | 4,000 / 4,000 SF | 9,000 / 9,000 SF | 7,000 / 7,00 |
| Level 4 | Jul 12, 2020 | COMPLETE | 10,000 / 10,000 LF | 9,000 / 9,000 LF | 4,000 / 4,000 SF | 9,000 / 9,000 SF | 7,000 / 7,00 |
| Level 5 | Jul 25, 2020 | IN PROGRESS | 10,000 / 10,000 LF | 5,400 / 9,000 LF | 2,400 / 4,000 SF | 4,950 / 9,000 SF | 2,100 / 7,00 |
| Level 6 | Jul 25, 2020 | IN PROGRESS | 10,000 / 10,000 LF | 6,300 / 9,000 LF | 2,200 / 4,000 SF | 4,500 / 9,000 SF | 1,750 / 7,00 |
| Level 7 | Jul 28, 2020 | IN PROGRESS | 6,900 / 10,000 LF | 3,600 / 9,000 LF | 1,680 / 4,000 SF | 4,500 / 9,000 SF | 0 / 7,000 |
| Level 8 | Aug 1, 2020 | IN PROGRESS | 5,000 / 10,000 LF | 3,060 / 9,000 LF | 1,200 / 4,000 SF | 0 / 9,000 SF | 0 / 7,000 |
| Level 9 | No capture taken | NOT STARTED | 0 / 10,000 LF | 0 / 9,000 LF | 0 / 4,000 SF | 0 / 9,000 SF | 0 / 7,000 |
| Level 10 | No capture taken | NOT STARTED | 0 / 10,000 LF | 0 / 9,000 LF | 0 / 4,000 SF | 0 / 9,000 SF | 0 / 7,000 |

Figure 4D:
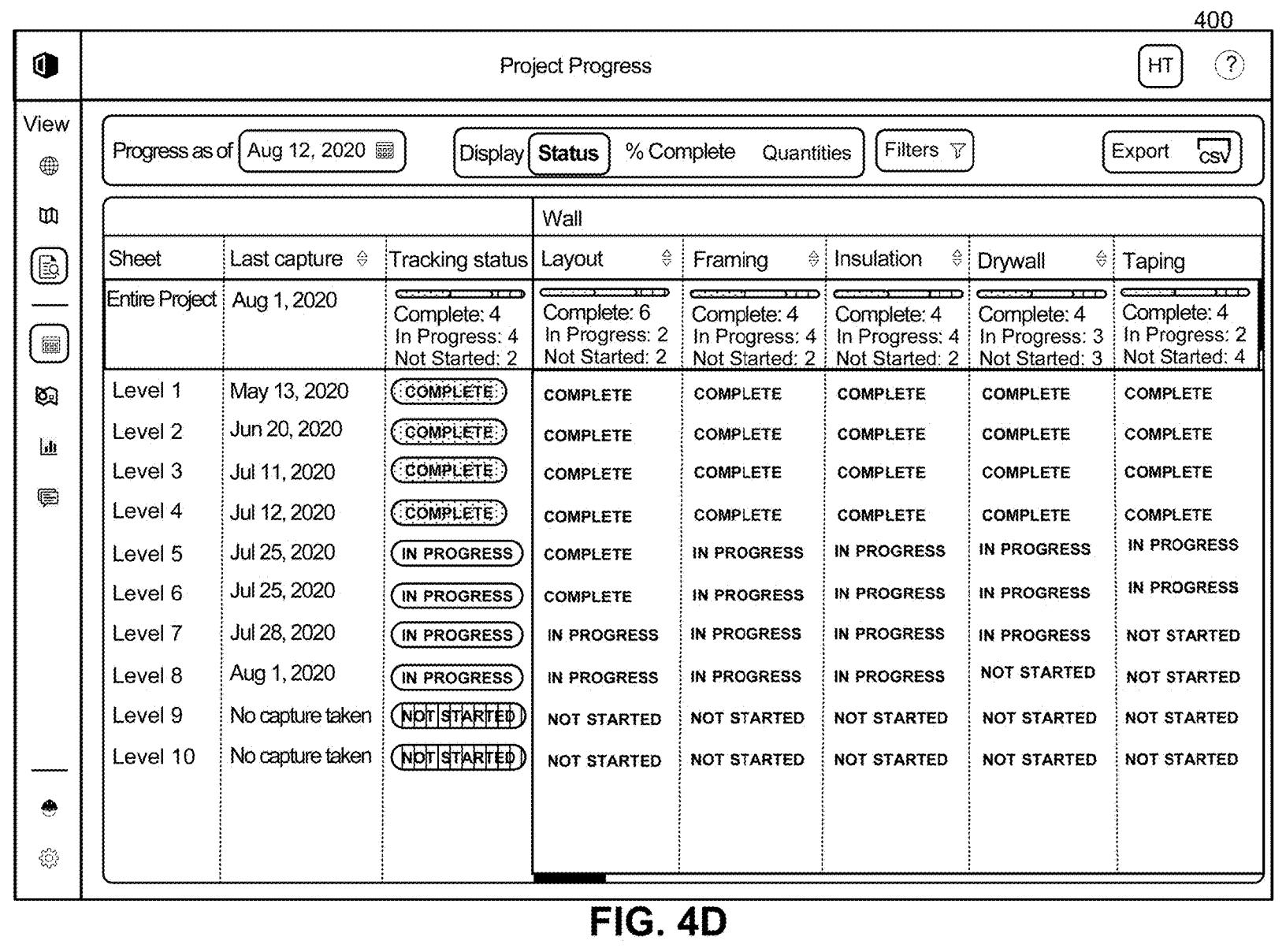

Project Progress

HT ?

View

Progress as of Aug 12, 2020

Display Status % Complete Quantities

Filters

Export CSV

| | | | Wall | | | | |
|---|---|---|---|---|---|---|---|
| Sheet | Last capture | Tracking status | Layout | Framing | Insulation | Drywall | Taping |
| Entire Project | Aug 1, 2020 | Complete: 4<br>In Progress: 4<br>Not Started: 2 | Complete: 6<br>In Progress: 2<br>Not Started: 2 | Complete: 4<br>In Progress: 4<br>Not Started: 2 | Complete: 4<br>In Progress: 4<br>Not Started: 2 | Complete: 4<br>In Progress: 3<br>Not Started: 3 | Complete: 4<br>In Progress: 2<br>Not Started: 4 |
| Level 1 | May 13, 2020 | COMPLETE | COMPLETE | COMPLETE | COMPLETE | COMPLETE | COMPLETE |
| Level 2 | Jun 20, 2020 | COMPLETE | COMPLETE | COMPLETE | COMPLETE | COMPLETE | COMPLETE |
| Level 3 | Jul 11, 2020 | COMPLETE | COMPLETE | COMPLETE | COMPLETE | COMPLETE | COMPLETE |
| Level 4 | Jul 12, 2020 | COMPLETE | COMPLETE | COMPLETE | COMPLETE | COMPLETE | COMPLETE |
| Level 5 | Jul 25, 2020 | IN PROGRESS | COMPLETE | IN PROGRESS | IN PROGRESS | IN PROGRESS | IN PROGRESS |
| Level 6 | Jul 25, 2020 | IN PROGRESS | COMPLETE | IN PROGRESS | IN PROGRESS | IN PROGRESS | IN PROGRESS |
| Level 7 | Jul 28, 2020 | IN PROGRESS | IN PROGRESS | IN PROGRESS | IN PROGRESS | IN PROGRESS | NOT STARTED |
| Level 8 | Aug 1, 2020 | IN PROGRESS | IN PROGRESS | IN PROGRESS | IN PROGRESS | NOT STARTED | NOT STARTED |
| Level 9 | No capture taken | NOT STARTED | NOT STARTED | NOT STARTED | NOT STARTED | NOT STARTED | NOT STARTED |
| Level 10 | No capture taken | NOT STARTED | NOT STARTED | NOT STARTED | NOT STARTED | NOT STARTED | NOT STARTED |

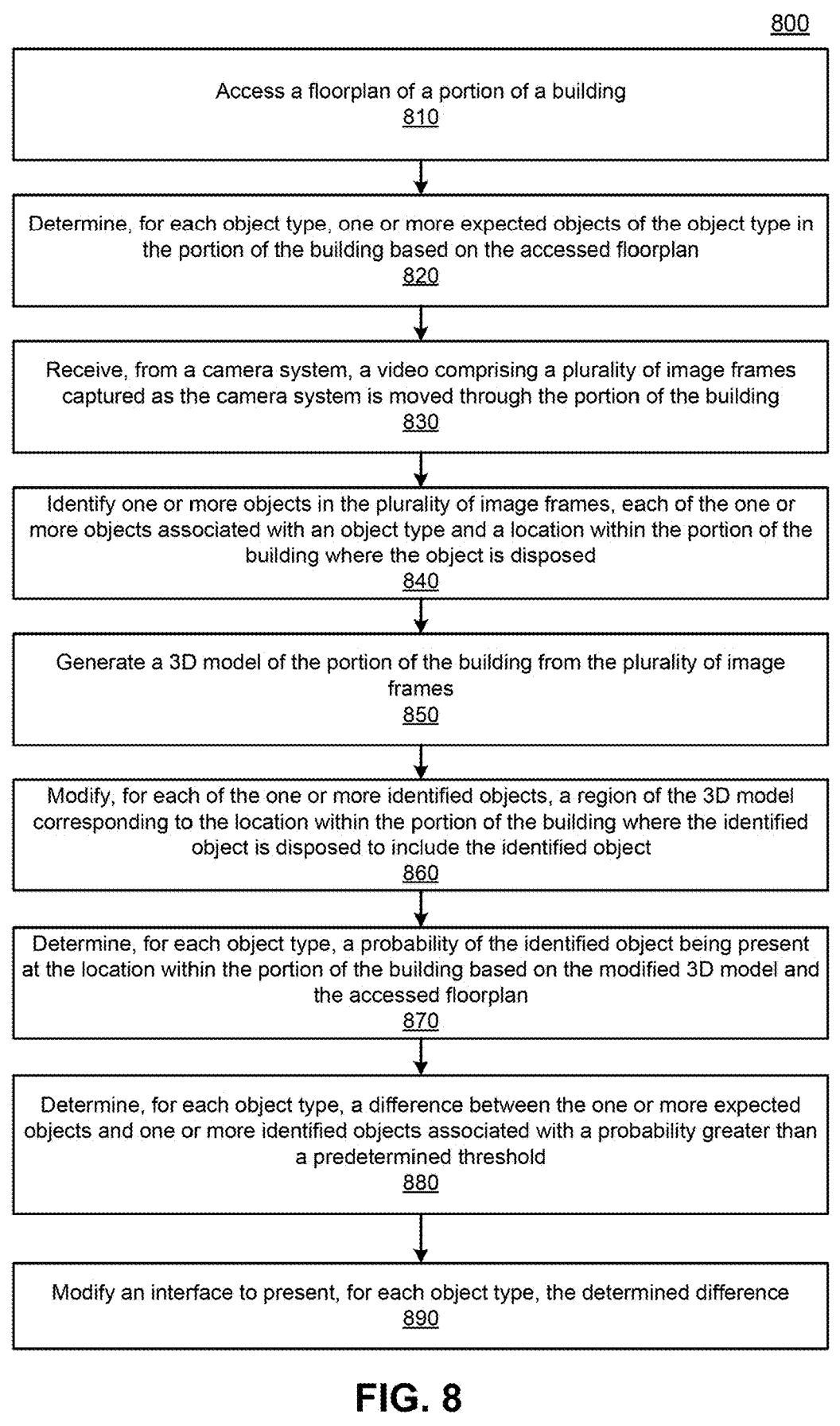

Access a floorplan of a portion of a building
810

Determine, for each object type, one or more expected objects of the object type in the portion of the building based on the accessed floorplan
820

Receive, from a camera system, a video comprising a plurality of image frames captured as the camera system is moved through the portion of the building
830

Identify one or more objects in the plurality of image frames, each of the one or more objects associated with an object type and a location within the portion of the building where the object is disposed
840

Generate a 3D model of the portion of the building from the plurality of image frames
850

Modify, for each of the one or more identified objects, a region of the 3D model corresponding to the location within the portion of the building where the identified object is disposed to include the identified object
860

Determine, for each object type, a probability of the identified object being present at the location within the portion of the building based on the modified 3D model and the accessed floorplan
870

Determine, for each object type, a difference between the one or more expected objects and one or more identified objects associated with a probability greater than a predetermined threshold
880

Modify an interface to present, for each object type, the determined difference
890

FIG. 8

MACHINE LEARNING BASED OBJECT IDENTIFICATION USING SCALED DIAGRAM AND THREE-DIMENSIONAL MODEL

CROSS REFERENCE TO RELATED APPLICATIONS

This application is a continuation of U.S. application Ser. No. 18/346,012, filed Jun. 30, 2023, which is a continuation of U.S. application Ser. No. 17/875,388, filed Jul. 27, 2022, now U.S. Pat. No. 11,734,882, which is a continuation of U.S. application Ser. No. 17/225,802, filed Apr. 8, 2021, now U.S. Pat. No. 11,436,812, which application claims the benefit of U.S. Provisional Application Ser. No. 63/032,452, filed May 29, 2020, which is incorporated in its entirety herein by this reference.

TECHNICAL FIELD

This disclosure relates to identifying objects in an environment and in particular to using machine learning to identify objects in an environment based on an annotated diagram and a three-dimensional model of the environment.

BACKGROUND

Conventionally, to determine types and locations of objects within an environment, a user captures a walkthrough video of the environment and manually identifies and tags the objects in the walkthrough video. For example, at a construction site, a variety of tasks are performed simultaneously on different parts of a building project, and it is difficult to keep track of progress for each aspect of the building project to determine whether the building project is on track to being completed on time. A general contractor may wish to monitor progress on the construction site by capturing a walkthrough video of the construction site that documents conditions of the construction site. The general contractor may then visually review the walkthrough video and identify objects installed (e.g., light fixtures, cabinets, windows, drywall, paint, cement) by identifying the objects present in the images. The general contractor may periodically capture new walkthrough videos and determine additional objects that have been installed to track progress of the building project over time. However, manual review of videos to count and measure objects is tedious and time consuming.

SUMMARY

A spatial indexing system receives a scaled diagram of an environment annotated with locations of objects expected to be in the environment. The objects are associated with object types, and the spatial indexing system determines a location and a type of object associated with each of the objects that are expected to be in the environment from the scaled diagram. The spatial indexing system also determines a total quantity of the objects that are expected to be in the environment for each of the object types. The spatial indexing system also receives a walkthrough video captured by a video capture system as the video capture system is moved through the environment along a camera path. The walkthrough video includes a sequence of image frames depicting conditions of an environment at a given time.

The spatial indexing system performs an object quantification operation to identify object types and locations of objects captured in the image frames of the walkthrough video to automatically estimate a quantity of objects for each object type in the environment when the walkthrough video was captured. To estimate the quantity, the spatial indexing system generates a 3-dimensional (3D) model of the environment that includes objects identified in the image frames. The spatial indexing system uses a machine learning model to determine a location and object type of each of the identified objects in the 3D model. The spatial indexing system determines a probability for each of the identified objects, where the probability is indicative of a likelihood of the object having that object type being present in the environment. When the probability is greater than a predetermined threshold, the spatial indexing system determines that the identified object is present in the environment. Based on the probabilities, the spatial indexing system determines an estimated quantity of each object type in the 3D model. For each object type, the estimated quantity of the object type can be compared to the expected total quantity of the object type and presented to a user.

BRIEF DESCRIPTION OF THE DRAWINGS

FIGS. 4A-4E illustrate a progress visualization interface provided by a progress visualization module, according to one embodiment.

FIG. 8 is a flow chart illustrating an example method for progress tracking using walkthrough videos, according to one embodiment.

DETAILED DESCRIPTION

I. Overview

A spatial indexing system receives annotated scaled diagrams of the physical environment as input and determines expected quantities of objects in the physical world. Users may capture images or videos of an environment in the physical world as the users move through the environment and document conditions of the physical world. The image data may be captured using monocular or stereo cameras, may be captured as individual photos or as sequences of images from a video, and may be captured using traditional or 360 degree cameras. Scaled diagrams (e.g. floorplans) of an environment in the physical world may be manually annotated by a person or automatically annotated by a machine learned model with locations and sizes of the objects that are expected to be in that environment. The annotated scaled diagrams provide locations and object types of objects expected to be in the environment and the image data provides locations and object types of objects actually in the environment at a given time. Based on a comparison of the expected objects from the annotated scaled diagrams and objects from the image data, users may determine that the objects identified from the image data deviates from the expected objects. The spatial indexing system may determine a difference between a quantity of expected objects and a quantity of objects identified from the image data for different object types. The difference may be used to track changes in the detected quantities over time relative to the expected quantities of objects.

II. System Environment

Figure 1:
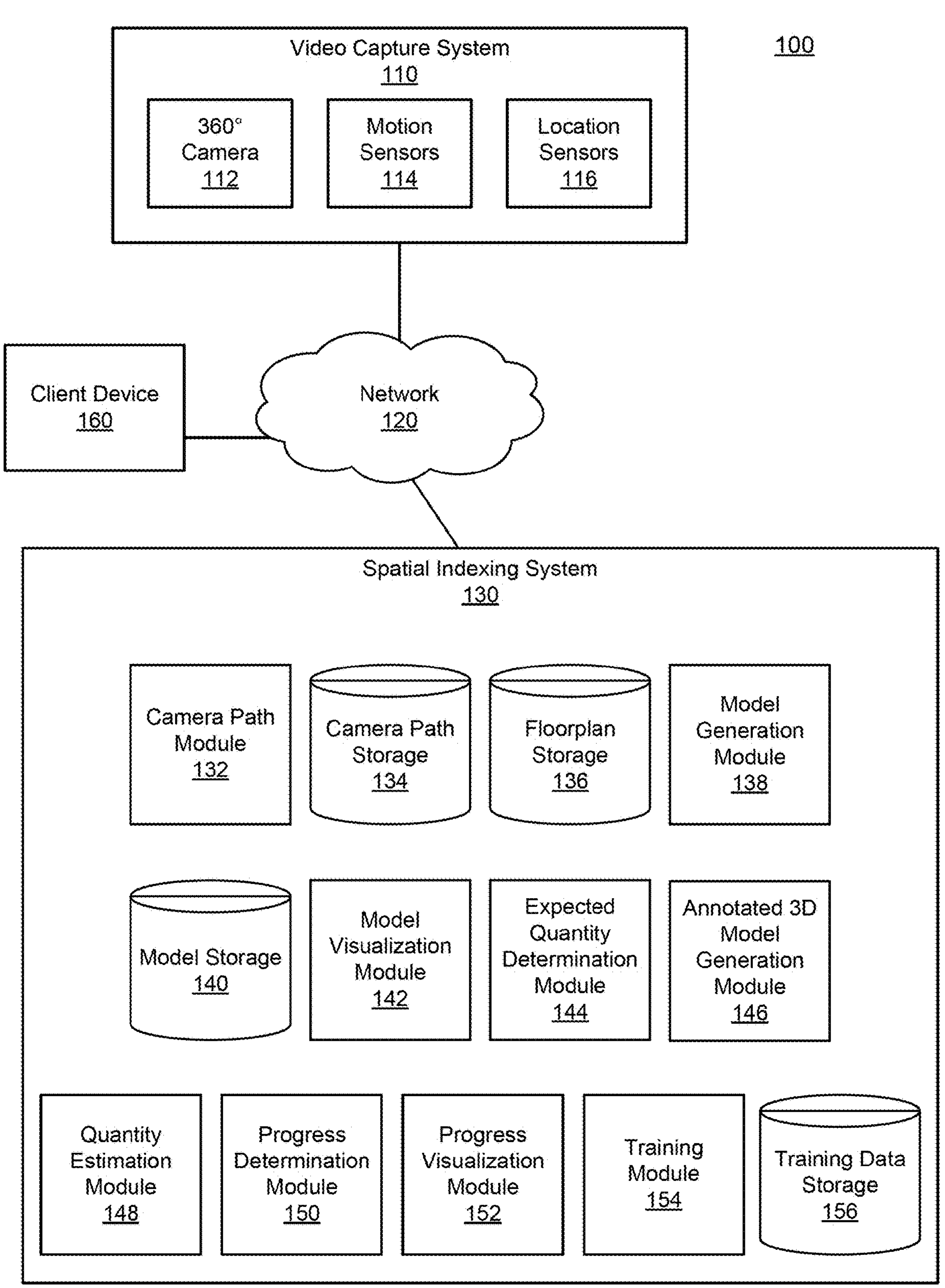
FIG. 1 illustrates a system environment for a spatial indexing system, according to one embodiment.

FIG. 1 illustrates a system environment 100 for a spatial indexing system, according to one embodiment. In the embodiment shown in FIG. 1, the system environment 100 includes a video capture system 110, a network 120, a spatial indexing system 130, and a client device 160. Although a single video capture system 110 and a single client device 160 is shown in FIG. 1, in some implementations the spatial indexing system interacts with multiple video capture systems 110 and multiple client devices 160.

The video capture system 110 collects one or more of frame data, motion data, lidar data, and location data as the video capture system 110 is moved along a camera path. In the embodiment shown in FIG. 1, the video capture system 110 includes a 360-degree camera 112, motion sensors 114, and location sensors 116. The video capture system 110 is implemented as a device with a form factor that is suitable for being moved along the camera path. In one embodiment, the video capture system 110 is a portable device that a user physically moves along the camera path, such as a wheeled cart or a device that is mounted on or integrated into an object that is worn on the user's body (e.g., a backpack or hardhat). In another embodiment, the video capture system 110 is mounted on or integrated into a vehicle. The vehicle may be, for example, a wheeled vehicle (e.g., a wheeled robot) or an aircraft (e.g., a quadcopter drone), and can be configured to autonomously travel along a preconfigured route or be controlled by a human user in real-time.

The 360-degree camera 112 collects frame data by capturing a sequence of 360-degree frames as the video capture system 110 is moved along the camera path. As referred to herein, a 360-degree frame is a frame having a field of view that covers a 360-degree field of view. The 360-degree camera 112 can be implemented by arranging multiple non-360-degree cameras in the video capture system 110 so that they are pointed at varying angles relative to each other, and configuring the 360-degree cameras to capture frames of the environment from their respective angles at approximately the same time. The image frames can then be combined to form a single 360-degree frame. For example, the 360-degree camera 112 can be implemented by capturing frames at substantially the same time from two 180° panoramic cameras that are pointed in opposite directions.

The image frame data captured by the video capture system 110 may further include frame timestamps. The frame timestamps are data corresponding to the time at which each frame was captured by the video capture system 110. As used herein, frames are captured at substantially the same time if they are captured within a threshold time interval of each other (e.g., within 1 second, within 100 milliseconds, etc.).

In one embodiment, the 360-degree camera 112 captures a 360-degree video, and the image frames in 360-degree video are the image frames of the walkthrough video. In another embodiment, the 360-degree camera 112 captures a sequence of still frames separated by fixed time intervals. The walkthrough video that is a sequence of frames can be captured at any frame rate, such as a high frame rate (e.g., 60 frames per second) or a low frame rate (e.g., 1 frame per second). In general, capturing the walkthrough video that is a sequence of frames at a higher frame rate produces more robust results, while capturing the walkthrough video that is a sequence of frames at a lower frame rate allows for reduced data storage and transmission. The motion sensors 114 and location sensors 116 collect motion data and location data, respectively, while the 360-degree camera 112 is capturing the image frame data. The motion sensors 114 can include, for example, an accelerometer and a gyroscope. The motion sensors 114 can also include a magnetometer that measures a direction of a magnetic field surrounding the video capture system 110.

The location sensors 116 can include a receiver for a global navigation satellite system (e.g., a GPS receiver) that determines the latitude and longitude coordinates of the video capture system 110. In some embodiments, the location sensors 116 additionally or alternatively include a receiver for an indoor positioning system (IPS) that determines the position of the video capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the video capture system 110 shown in FIG. 1 includes a 360-degree camera 112, motion sensors 114, and location sensors 116, some of the components 112, 114, 116 may be omitted from the video capture system 110 in other embodiments. For instance, one or both of the motion sensors 114 and the location sensors 116 may be omitted from the video capture system. In addition, although the video capture system 110 is described in FIG. 1 with a 360-degree camera 112, the video capture system 110 may alternatively include a camera with a narrow field of view. Although not illustrated, in some embodiments, the video capture system 110 may further include a lidar system that emit laser beams and generates 3D data representing the surrounding environment based on measured distances to points in the surrounding environment. Based on the 3D data, a 3D model (e.g., a point cloud) of the surrounding environment may be generated. The 3D data captured by the lidar system may be synchronized with the image frames captured by the 360-degree camera 112.

In some embodiments, the video capture system 110 is implemented as part of a computing device (e.g., the computer system 900 shown in FIG. 9) that also includes a storage device to store the captured data and a communication interface that sends the captured data over the network 120 to the spatial indexing system 130. In one embodiment, the video capture system 110 stores the captured data locally as the system 110 is moved along the camera path, and the data is sent to the spatial indexing system 130 after the data collection has been completed. In another embodiment, the video capture system 110 sends the captured data to the spatial indexing system 130 in real-time as the system 110 is being moved along the camera path.

The video capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

The spatial indexing system 130 receives the image frames and the other data collected by the video capture system 110, performs a spatial indexing process to automatically identify the spatial locations at which each of the image frames and images were captured to align the image frames to an annotated floorplan of the environment, builds a 3D model of the environment, provides a visualization interface that allows the client device 160 to view the captured image frames at their respective locations within the 3D model. The spatial indexing system 130 may be used for automatically quantifying objects that are in the environment based on the image frames and the other data collected by the video capture system 110. When the environment is a construction site, the spatial indexing system 130 may track the progress of construction based on the determined quantity of objects in the image frames and comparing the determined quantity to a quantity of objects that are expected to be in the environment for each object type as indicated in the annotated floorplan of the environment. In the embodiment shown in FIG. 1, the spatial indexing system 130 includes a camera path module 132, a camera path storage 134, a floorplan storage 136, a model generation module 138, a model storage 140, a model visualization module 142, an expected quantity determination module 144, an annotated 3D model generation module 146, a quantity estimation module 148, a progress determination module 150, a progress visualization module 152, a training module 154, and a training data storage 156.

The camera path module 132 receives the image frames in the walkthrough video and the other data that were collected by the video capture system 110 as the system 110 was moved along the camera path and determines the camera path based on the received frames and data. In one embodiment, the camera path is defined as a 6D camera pose for each frame in the walkthrough video that is a sequence of frames. The 6D camera pose for each frame is an estimate of the relative position and orientation of the 360-degree camera 112 when the image frame was captured. The camera path module 132 can store the camera path in the camera path storage 134.

In one embodiment, the camera path module 132 uses a SLAM (simultaneous localization and mapping) algorithm to simultaneously (1) determine an estimate of the camera path by inferring the location and orientation of the 360-degree camera 112 and (2) model the environment using direct methods or using landmark features (such as oriented FAST and rotated BRIEF (ORB), scale-invariant feature transform (SIFT), speeded up robust features (SURF), etc.) extracted from the walkthrough video that is a sequence of frames. The camera path module 132 outputs a vector of six dimensional (6D) camera poses over time, with one 6D vector (three dimensions for location, three dimensions for orientation) for each frame in the sequence, and the 6D vector can be stored in the camera path storage 134. An embodiment of the camera path module 132 is described in detail below with respect to FIG. 2A.

The spatial indexing system 130 can also include floorplan storage 136, which stores one or more floorplans, such as those of environments captured by the video capture system 110. As referred to herein, a floorplan is a to-scale, two-dimensional (2D) diagrammatic representation of an environment (e.g., a portion of a building or structure) from a top-down perspective. In alternative embodiments, the floorplan may be a 3D model of the expected finished construction instead of a 2D diagram. The floorplan is annotated to specify the positions, the dimensions, and the object types of physical objects expected to be in the environment after construction is complete as well. In some embodiments, the floorplan is manually annotated by a user associated with a client device 160 and provided to the spatial indexing system 130. In other embodiments, the floorplan is annotated by the spatial indexing system 130 using a machine learning model that is trained using a training dataset of annotated floorplans to identify the positions, the dimensions, and the object types of physical objects expected to be in the environment. Each of the physical objects is associated with an object type such as doors, windows, walls, stairs, light fixtures, and cabinets. An object type may be associated with a construction material such as drywall, paint, cement, bricks, and wood. The different portions of a building or structure may be represented by separate floorplans. For example, in the construction example described above, the spatial indexing system 130 may store separate floorplans for each floor, unit, or substructure. In some embodiments, a given portion of the building or structure may be represented with a plurality of floorplans that each corresponds to a different trade such as mechanical, electrical, or plumbing.

The model generation module 136 generates a 3D model of the environment. As referred to herein, the 3D model is an immersive model representative of the environment generated using image frames from the walkthrough video of the environment, the relative positions of each of the image frames (as indicated by the image frame's 6D pose), and (optionally) the absolute position of each of the image frames on a floorplan of the environment. The model generation module 136 aligns image frames to the annotated floorplan. Because the 3D model is generated using image frames that are aligned with the annotated floorplan, the 3D model is also aligned with the annotated floorplan. In one embodiment, the model generation module 136 receives a frame sequence and its corresponding camera path (e.g., a 6D pose vector specifying a 6D pose for each frame in the walkthrough video that is a sequence of frames) from the camera path module 132 or the camera path storage 134 and extracts a subset of the image frames in the sequence and their corresponding 6D poses for inclusion in the 3D model. For example, if the walkthrough video that is a sequence of frames are frames in a video that was captured at 30 frames per second, the model generation module 136 subsamples the image frames by extracting frames and their corresponding 6D poses at 0.5-second intervals. An embodiment of the model generation module 136 is described in detail below with respect to FIG. 2B. The model generation module 138 may use methods such as structure from motion (SfM), simultaneous localization and mapping (SLAM), monocular depth map generation, or other methods for generating 3D representations of the environment based on image frames in the walkthrough video. In some embodiments, the model generation module 138 may receive lidar data from the video capture system 110 and generate a 3D point cloud. After generating the 3D model, the model generation module 138 stores the 3D model in the model storage 140. The model storage 140 may also store the walkthrough video used to generate the 3D model in the model storage 140.

The model visualization module 142 provides a visualization interface to the client device 160. The visualization interface allows the user to view the 3D model in two ways. First, the visualization interface provides a 2D overhead map interface representing the corresponding floorplan of the environment from the floorplan storage 136. The 2D overhead map is an interactive interface in which each relative camera location indicated on the 2D map is interactive, such that clicking on a point on the map navigates to the portion of the 3D model corresponding to the selected point in space. Second, the visualization interface provides a first-person view of an extracted 360-degree frame that allows the user to pan and zoom around the image frame and to navigate to other frames by selecting waypoint icons within the image frame that represent the relative locations of the other frames. The visualization interface provides the first-person view of a frame after the user selects the image frame in the 2D overhead map or in the first-person view of a different frame.

The expected quantity determination module 144 accesses an annotated floorplan of an environment and identifies objects that are expected to be in the environment. The expected quantity determination module 144 determines instances where objects appear in the annotated floorplan, each object associated with a location within the environment and an object type. After identifying the objects in the annotated floorplan, the expected quantity determination module 144 determines a total quantity of objects that are expected to be in the environment for each object type when construction is completed. The expected quantity determination module 144 may use a machine learning model trained by the training module 144 based on training data of annotated floorplans to identify where objects appear in the annotated floorplan and object types of the identified objects. For each object type that a user wishes to monitor, the expected quantity determination module 144 determines a total quantity of objects for that object type as indicated in the annotated floorplan. For example, for a given floor of a building, the user may wish to monitor the progress on the installation of windows, doors, windows, light fixtures, and walls, and the expected quantity determination module 144 determines a total number of windows, doors, windows, and walls that should be on the floor at the end of constructions. For each object type that can be counted, the expected quantity determination module 144 may determine a total number of instances where an object associated with the object type appears in the annotated floorplan. For example, the expected quantity determination module 144 performs text recognition or image recognition analysis on the annotated floorplan to determine the number of instances where text or images representative of the object types appears in the annotated floorplan.

In some embodiments, an object type may be associated with a total amount of construction material expected to be used during construction based on annotated the floorplan of the environment. For each object type that cannot be counted such as paint, cement, and drywall, the expected quantity determination module 144 may add up dimensions of portions of the floorplan associated with the object type and determine the total amount of construction material expected to be used. The annotated floorplan may include boundaries around different portions of the floorplan that use a particular type of construction material, and the expected quantity determination module 144 may determine a sum of the dimensions of the boundaries to determine a total amount of construction material type expected to be used to complete the constructions. In a simpler implementation, the annotated floorplan may indicate the dimensions of the materials in linear feet, and the expected quantity determination module 144 may determine the expected quantity in linear feet or extrapolate two-dimensional expected quantity in square feet based on known features about the building. For example, if the annotated floorplan indicates that 80 ft of drywall is expected in length, the expected quantity determination module 144 may multiply the length by the known height of the wall to determine the two-dimensional expected quantity.

The annotated 3D model generation module 146 identifies objects captured in the image frames of the walkthrough video and modifies the 3D model generated by the model generation module 138 to include the identified objects. Each image frame of the walkthrough video is provided to a machine learning model such as a neural network classifier, nearest neighbor classifier, or other types of models configured to detect objects and identify object types and locations of the objects within the environment. The annotated 3D model generation module 146 may perform object detection, semantic segmentation, and the like to identify the object types and regions of pixels representing the objects in the image. Because the image frames are aligned with the floorplan, the annotated 3D model generation module 146 can determine locations within the environment where the objects were detected. The machine learning model may be trained by the training module 154 and trained based on training data including annotated image frames of historical environments stored in the training data storage 156. For each image frame, the machine learning model may output a classified image frame that identifies regions where objects were detected, each region associated with an object type.

After generating the 3D model and identifying the objects in the image frames, the annotated 3D model generation module 146 modifies regions of the 3D model to include the identified objects. The 3D model of the environment may be combined with the classified image frames by projecting the classified image frames onto the 3D model. Details on the annotated 3D model generation module 146 is described with respect to FIG. 2C.

The quantity estimation module 148 estimates a quantity of each object type in the annotated 3D model by comparing it to the annotated floorplan of the environment. The annotated 3D model is compared to the annotated floorplan in order to determine the regions of the 3D model classified with objects types (e.g. regions of the 3D model classified as "cabinets") that overlap with the regions of the annotated floorplan annotated with the object types (e.g. regions of the floorplan that were annotated as where "cabinets" will be installed).

In one embodiment, to determine whether an object associated with an object type exists in the 3D model, the amount of overlap between a region of the annotated floorplan labelled with the object type and the corresponding region of the annotated 3D model classified with the object type is calculated. If the amount of overlap passes a predetermined threshold, then that object type is considered to exist in that region on the 3D model. In another embodiment, a supervised classifier (e.g. a neural network classifier) is trained by the training module 154 using labeled data in the training data storage 156 to determine if a particular object exists in a region on the annotated 3D model. Each instance in the labeled training data set may correspond to an environment and comprised of an annotated 3D model modified to include objects that were identified in a walkthrough video of the environment and an annotated floorplan with labels indicating the presence of objects at locations on the annotated floorplan. After the supervised classifier has been trained, the quantity estimation module 148 applies the supervised classifier to an input annotated floorplan and annotated 3D model to receive as output probabilities of object types existing at regions of the annotated 3D model. The quantity estimation module 148 may compare the output probabilities to a predetermined threshold. When a probability associated with an object type for a given region is greater than the predetermined threshold, the quantity estimation module 148 determines that an object having the object type is present at the region. When the probability is lower than the predetermined threshold, the quantity module 148 determines that no object having the object type is present at the region.

A benefit of using a comparison between the annotated 3D model and the annotated floorplan is that noise in the 3D model can be reduced, which improves accuracy of object detection and progress tracking in construction. The quantity estimation module 148 does not include classified regions of the annotated 3D model that do not match the annotated floorplan in the estimated quantities of object types. For example, the annotated 3D model may incorrectly indicate that there is drywall on the floor due to noise, which can cause overestimation in the amount of drywall used during construction. However, the drywall on the floor is not included in the estimated quantity because the annotated floorplan indicates that there should be no drywall on the floor. Another benefit of using the comparison between the annotated 3D model and the annotated floorplan is being able to detect installation errors. If there is misalignment between the updated 3D model and the annotated floorplan that exceeds a predetermined threshold, the misalignment may be flagged for a human operator to manually review. For example, if the 3D model indicates that a wall is constructed where there shouldn't be a wall according to the annotated floorplan, the error may be flagged.

In another embodiment, a supervised classifier is trained by the training module 154 using a training set in the training data storage 156 in which each instance is associated with an environment and comprised of an unannotated 3D model generated from a walkthrough video of the environment, an annotated floorplan with labels indicating the presence of objects at locations on the annotated floorplan, and a set of image frames from the walkthrough video in which the locations on the annotated floorplan labelled with objects is visible. In this embodiment, the 3D model from the model generation module 138 is provided as input to the quantity estimation module 148 along with the walkthrough video and the annotated floorplan without being processed by the annotated 3D model generation module 146. The supervised classifier outputs probabilities of object types existing at regions of the annotated 3D model.

Another benefit of using the comparison between the annotated 3D model and the annotated floorplan instead of using the comparison between two dimensional image frames from the walkthrough video is that the annotated 3D model can validate the location of objects detected in the image frames. For example, an annotated floorplan indicates that at the end of construction, there should be a first wall at a first distance from a reference point and a second wall parallel to the first wall at a second distance from the reference point. The first distance is less than the second distance such that at the end of construction, the second wall is not visible from the reference point because it is obstructed by the first wall. If an image frame captured from the reference point during construction includes drywall, the spatial indexing system 130 may not be able to determine whether the drywall is part of the first wall or the second wall because the image frame does not include depth information. However, with the annotated 3D model, the spatial indexing system 130 can distinguish the two walls.

Historical information can also be used to bias the quantity estimation module 148 when determining the existence of an object in a location on the annotated 3D model as expected in the floorplan, particularly when the quantity estimation module 148 is used to quantify objects in the same location at different times. In one embodiment, Markov Models are used to model the probability of objects existing in locations of the annotated 3D model over time. For example, the presence of "drywall" in a location on the 3D model on one day can bias the system toward identifying "drywall" in the same location on a subsequent day, while reducing the probability that "framing" exists in that location on the subsequent day. Such probabilities can be learned from training data or estimated by a person based on real world constraints (e.g. that installation of "framing" typically precedes installation of "drywall") and provided to the system.

The progress determination module 150 calculates the progress of installation of object types indicated in the annotated floorplan. For each object type expected to be used during construction, the progress determination module 150 calculates the progress of installation by dividing a number of objects of an object type in the annotated 3D model determined by the quantity estimation module 148 by a total number of objects of the object type expected as determined by the expected quantity determination module 144. For an object type associated with a construction material, the regions in the annotated 3D model determined to have been installed with the construction material (e.g. drywall) and corresponding regions in the annotated floorplan are partitioned into tiles or cells. For each tile or cell, a score is calculated based on the overlap between the region on the annotated floorplan of that cell or tile, and the corresponding region in the annotated 3D model of that cell or tile. If the score passes a predetermined threshold then the amount of material defined by that tile or cell is considered to exist in that location on the floorplan. To calculate the progress of installation of an object type associated with a construction material, the number of cells or tiles of that material type that have been found to exist on the annotated 3D model is divided by the total number of cells or tiles of the particular material type expected as indicated in the annotated floorplan.

The progress visualization module 152 provides a visualization interface to the client device 160 to present the progress of construction. The progress visualization module 152 allows the user to view the progress made for different object types over time and for different parts of the environment. Examples of the visualization interface are described below with respect to FIGS. 4A and 4E.

The client device 160 is any computing device such as a smartphone, tablet computer, laptop computer that can connect to the network 120. The client device 160 displays, on a display device such as a screen, the interface to a user and receives user inputs to interact with the interface. An example implementation of the client device is described below with reference to the computer system 900 in FIG. 9.

IV. Camera Path Generation Overview

Figure 2A:
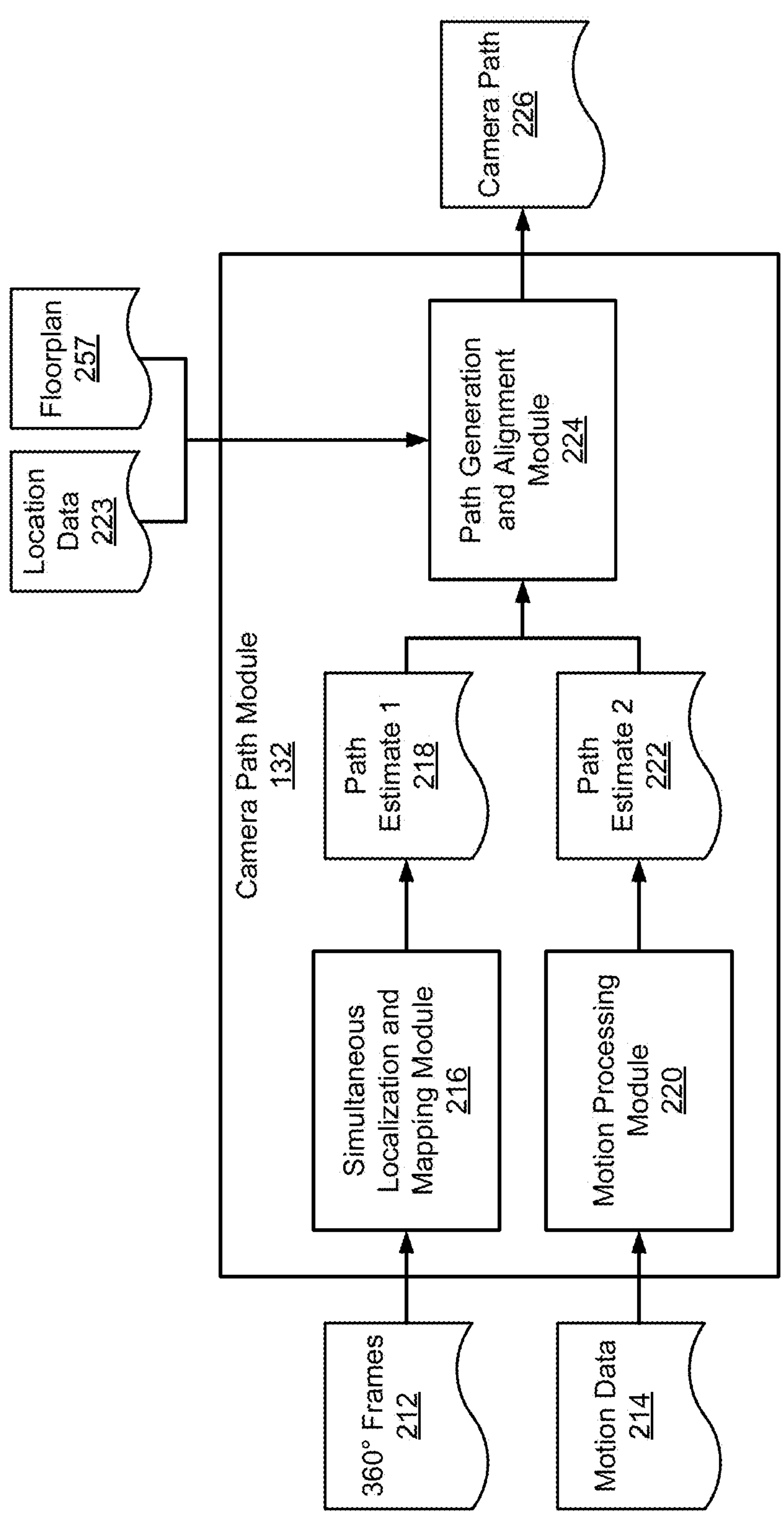
FIG. 2A illustrates a block diagram of a camera path module, according to one embodiment.

FIG. 2A illustrates a block diagram of the camera path module 132 of the spatial indexing system 130 shown in FIG. 1, according to one embodiment. The camera path module 132 receives input data (e.g., a sequence of 360-degree frames 212, motion data 214, and location data 223) captured by the video capture system 110 and generates a camera path 226. In the embodiment shown in FIG. 2A, the camera path module 132 includes a simultaneous localization and mapping (SLAM) module 216, a motion processing module 220, and a path generation and alignment module 224.

The SLAM module 216 receives the sequence of 360-degree frames 212 and performs a SLAM algorithm to generate a first estimate 218 of the camera path. Before performing the SLAM algorithm, the SLAM module 216 can perform one or more preprocessing steps on the image frames 212. In one embodiment, the pre-processing steps include extracting features from the image frames 212 by converting the sequence of 360-degree frames 212 into a sequence of vectors, where each vector is a feature representation of a respective frame. In particular, the SLAM module can extract SIFT features, SURF features, or ORB features.

After extracting the features, the pre-processing steps can also include a segmentation process. The segmentation process divides the walkthrough video that is a sequence of frames into segments based on the quality of the features in each of the image frames. In one embodiment, the feature quality in a frame is defined as the number of features that were extracted from the image frame. In this embodiment, the segmentation step classifies each frame as having high feature quality or low feature quality based on whether the feature quality of the image frame is above or below a threshold value, respectively (i.e., frames having a feature quality above the threshold are classified as high quality, and frames having a feature quality below the threshold are classified as low quality). Low feature quality can be caused by, e.g., excess motion blur or low lighting conditions.

After classifying the image frames, the segmentation process splits the sequence so that consecutive frames with high feature quality are joined into segments and frames with low feature quality are not included in any of the segments. For example, suppose the camera path travels into and out of a series of well-lit rooms along a poorly-lit hallway. In this example, the image frames captured in each room are likely to have high feature quality, while the image frames captured in the hallway are likely to have low feature quality. As a result, the segmentation process divides the walkthrough video that is a sequence of frames so that each sequence of consecutive frames captured in the same room is split into a single segment (resulting in a separate segment for each room), while the image frames captured in the hallway are not included in any of the segments.

After the pre-processing steps, the SLAM module 216 performs a SLAM algorithm to generate a first estimate 218 of the camera path. In one embodiment, the first estimate 218 is also a vector of 6D camera poses over time, with one 6D vector for each frame in the sequence. In an embodiment where the pre-processing steps include segmenting the walkthrough video that is a sequence of frames, the SLAM algorithm is performed separately on each of the segments to generate a camera path segment for each segment of frames.

The motion processing module 220 receives the motion data 214 that was collected as the video capture system 110 was moved along the camera path and generates a second estimate 222 of the camera path. Similar to the first estimate 218 of the camera path, the second estimate 222 can also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the video capture system 110.

The data generated by many consumer-grade gyroscopes includes a time-varying bias (also referred to as drift) that can impact the accuracy of the second estimate 222 of the camera path if the bias is not corrected. In an embodiment where the motion data 214 includes all three types of data described above (accelerometer, gyroscope, and magnetometer data), and the motion processing module 220 can use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the video capture system 110. Meanwhile, the magnetometer data is used to estimate the heading bias of the gyroscope. Because magnetometer data can be noisy, particularly when used inside a building whose internal structure includes steel beams, the motion processing module 220 can compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the camera path into a combined estimate of the camera path 226. In an embodiment where the video capture system 110 also collects location data 223 while being moved along the camera path, the path generation module 224 can also use the location data 223 when generating the camera path 226. If a floorplan of the environment is available, the path generation and alignment module 224 can also receive the floorplan 257 as input and align the combined estimate of the camera path 216 to the floorplan 257. Example techniques for combining the first estimate 218 and the second estimate 222 and aligning the camera path to a floorplan are described below with respect to FIGS. 5, 6, and 7.

V. Model Generation Overview

Figure 2B:
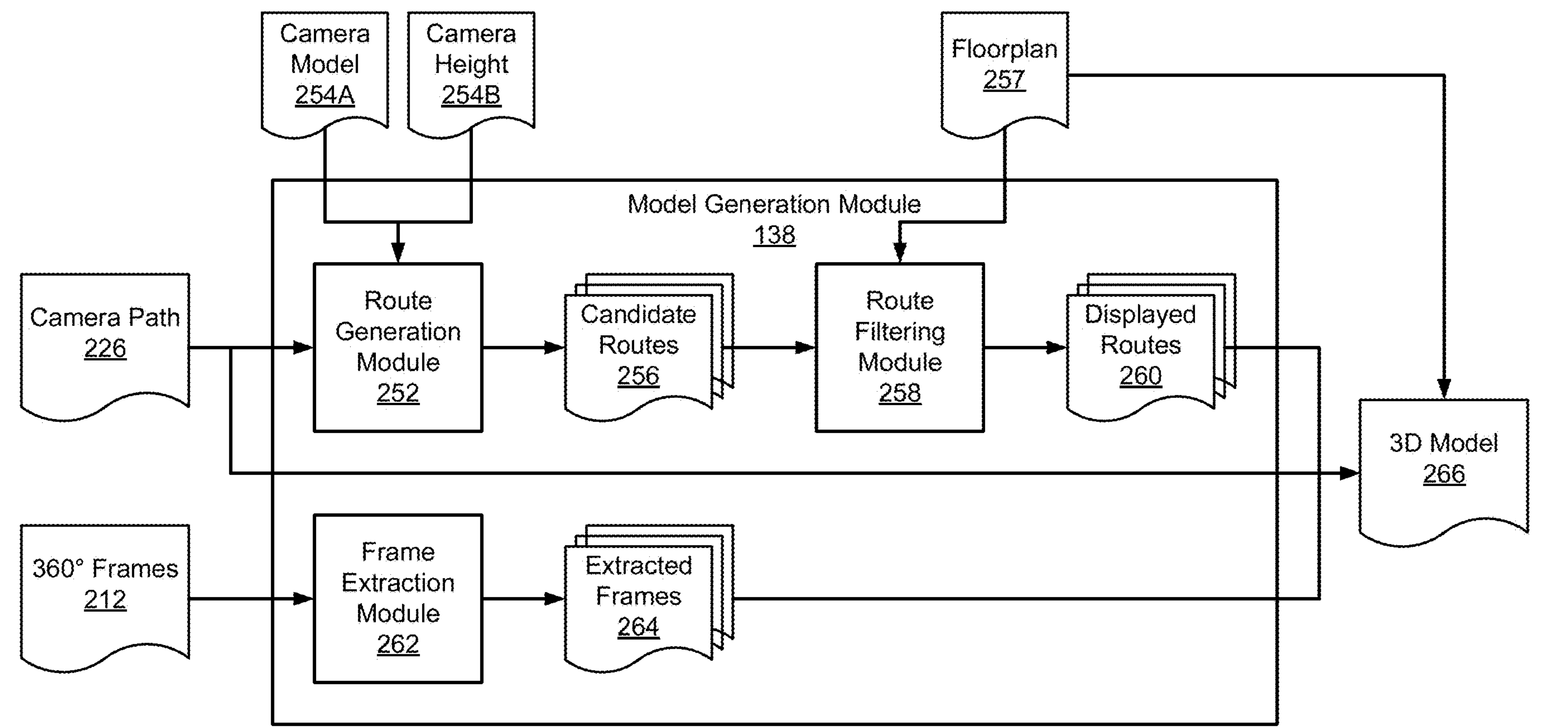
FIG. 2B illustrates a block diagram of a model generation module, according to one embodiment.

FIG. 2B illustrates a block diagram of the model generation module 138 of the spatial indexing system 130 shown in FIG. 1, according to one embodiment. The model generation module 138 receives the camera path 226 generated by the camera path module 132, along with the sequence of 360-degree frames 212 that were captured by the video capture system 110, a floorplan 257 of the environment, and information about the 360-degree camera 254. The output of the model generation module 138 is a 3D model 266 of the environment. In the illustrated embodiment, the model generation module 138 includes a route generation module 252, a route filtering module 258, and a frame extraction module 262.

The route generation module 252 receives the camera path 226 and 360-degree camera information 254 and generates one or more candidate route vectors 256 for each extracted frame. The 360-degree camera information 254 includes a camera model 254A and camera height 254B. The camera model 254A is a model that maps each 2D point in a 360-degree frame (i.e., as defined by a pair of coordinates identifying a pixel within the image frame) to a 3D ray that represents the direction of the line of sight from the 360-degree camera to that 2D point. In one embodiment, the spatial indexing system 130 stores a separate camera model for each type of camera supported by the system 130. The camera height 254B is the height of the 360-degree camera relative to the floor of the environment while the walkthrough video that is a sequence of frames is being captured. In one embodiment, the 360-degree camera height is assumed to have a constant value during the image frame capture process. For instance, if the 360-degree camera is mounted on a hardhat that is worn on a user's body, then the height has a constant value equal to the sum of the user's height and the height of the 360-degree camera relative to the top of the user's head (both quantities can be received as user input).

As referred to herein, a route vector for an extracted frame is a vector representing a spatial distance between the extracted frame and one of the other extracted frames. For instance, the route vector associated with an extracted frame has its tail at that extracted frame and its head at the other extracted frame, such that adding the route vector to the spatial location of its associated frame yields the spatial location of the other extracted frame. In one embodiment, the route vector is computed by performing vector subtraction to calculate a difference between the three-dimensional locations of the two extracted frames, as indicated by their respective 6D pose vectors.

Referring to the model visualization module 142, the route vectors for an extracted frame are later used after the model visualization module 142 receives the 3D model 266 and displays a first-person view of the extracted frame. When displaying the first-person view, the model visualization module 142 renders a waypoint icon (shown in FIG. 3B as a circle) at a position in the image frame that represents the position of the other frame (e.g., the image frame at the head of the route vector). In one embodiment, the model visualization module 140 uses the following equation to determine the position within the image frame at which to render the waypoint icon corresponding to a route vector:

$$P_{icon} = M_{proj} * (M_{view})^{-1} * M_{delta} * G_{ring}.$$

In this equation, $M_{proj}$ is a projection matrix containing the parameters of the 360-degree camera projection function used for rendering, $M_{view}$ is an isometry matrix representing the user's position and orientation relative to his or her current frame, $M_{delta}$ is the route vector, $G_{ring}$ is the geometry (a list of 3D coordinates) representing a mesh model of the waypoint icon being rendered, and $P_{icon}$ is the geometry of the icon within the first-person view of the image frame.

Referring again to the route generation module 138, the route generation module 252 can compute a candidate route vector 256 between each pair of extracted frames. However, displaying a separate waypoint icon for each candidate route vector associated with an frame can result in a large number of waypoint icons (e.g., several dozen) being displayed in an frame, which can overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 256 can select the displayed route vectors 256 based on a variety of criteria. For example, the candidate route vectors 256 can be filtered based on distance (e.g., only route vectors having a length less than a threshold length are selected).

In some embodiments, the route filtering module 256 also receives a floorplan 257 of the environment and also filters the candidate route vectors 256 based on features in the floorplan. In one embodiment, the route filtering module 256 uses the features in the floorplan to remove any candidate route vectors 256 that pass through a wall, which results in a set of displayed route vectors 260 that only point to positions that are visible in the image frame. This can be done, for example, by extracting an frame patch of the floorplan from the region of the floorplan surrounding a candidate route vector 256, and submitting the image frame patch to an frame classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The image frame extraction module 262 receives the sequence of 360-degree frames and extracts some or all of the image frames to generate extracted frames 264. In one embodiment, the sequences of 360-degree frames are captured as frames of a 360-degree walkthrough video, and the image frame extraction module 262 generates a separate extracted frame of each frame. As described above with respect to FIG. 1, the image frame extraction module 262 can also extract a subset of the walkthrough video that is a sequence of 360-degree frames 212. For example, if the walkthrough video that is a sequence of 360-degree frames 212 was captured at a relatively high framerate (e.g., 30 or 60 frames per second), the image frame extraction module 262 can extract a subset of the image frames at regular intervals (e.g., two frames per second of video) so that a more manageable number of extracted frames 264 are displayed to the user as part of the 3D model.

The floorplan 257, displayed route vectors 260, camera path 226, and extracted frames 264 are combined into the 3D model 266. As noted above, the 3D model 266 is a representation of the environment that comprises a set of extracted frames 264 of the environment, the relative positions of each of the image frames (as indicated by the 6D poses in the camera path 226). In the embodiment shown in FIG. 2B, the 3D model also includes the floorplan 257, the absolute positions of each of the image frames on the floorplan, and displayed route vectors 260 for some or all of the extracted frames 264.

VI. Comparison of Annotated 3D Model and Floorplan

Figure 2C:
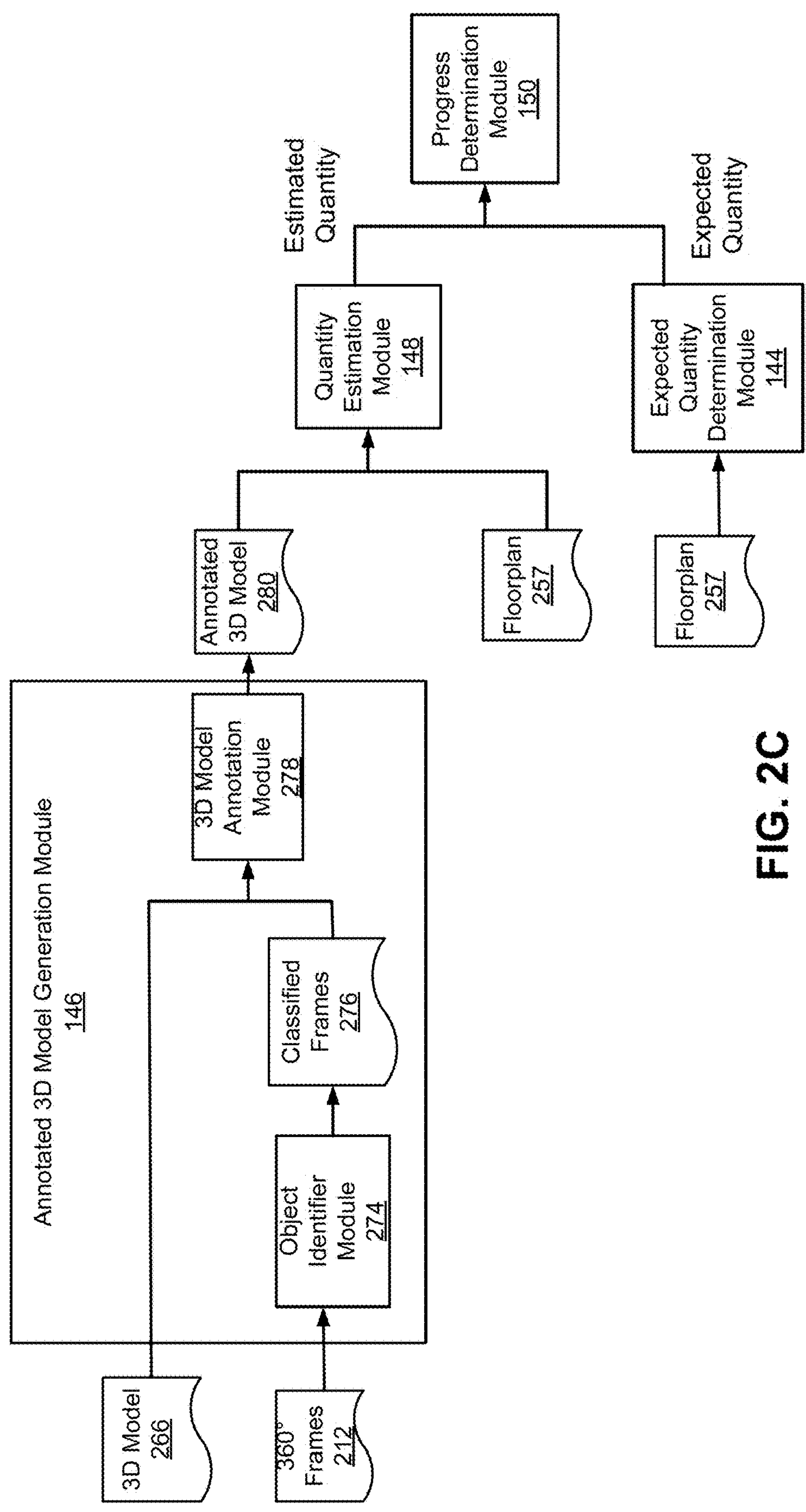
FIG. 2C illustrates a block diagram illustrating a comparison of an annotated 3D model and a floorplan, according to one embodiment.

FIG. 2C illustrates a block diagram illustrating a comparison of an annotated 3D model 280 and a floorplan 257, according to one embodiment. The annotated 3D model generation module 146 receives as input the 3D model 266 generated by the model generation module 138 and 360-degree frames 212 of the walkthrough video captured by the video capture system 110. The annotated 3D model generation module 144 includes an object identifier module 274 and a 3D model annotation module 278 and outputs an annotated 3D model 280. The object identifier module 274 identifies objects captured in the 360-degree frames 212. The object identifier module 274 may be a machine learning model such as a neural network classifier, nearest neighbor classifier, or other types of models configured to identify object types and locations of objects that are in the input image frame. The object identifier module 274 may also perform object detection, semantic segmentation, and the like to identify the types and locations of the objects in the image. The object identifier module 274 outputs classified image frames 276 that identifies regions where objects were detected, each region associated with an object type.

The 3D model 266 and the classified frames 276 are provided to the 3D model annotation module 278 that modifies the 3D model 266 to include objects in the classified frames 276. The 3D model annotation module 278 may project the classified frames 276 onto the 3D model 266. The 3D model 266 may be combined with the classified frames 276 by projecting each classified pixel in each classified frame to its corresponding point in the 3D model 255 using a calibrated camera model. Classification of points in the 3D model may be determined by combining the classifications from all the relevant pixels in each classified frame 276 frame (e.g. using a linear combination of classification probabilities).

The annotated 3D model 280 and the annotated floorplan 257 are provided as input to the quantity estimation module 148. The quantity estimation module 148 determines estimated quantities for each object type in the annotated 3D model 280 based on a comparison with the floorplan 257. The quantity estimation module 148 determines a likelihood of an object associated with an object type being present. The expected quantity determination module 144 then determines expected quantities of objects for each object type that should be in the environment upon completion of construction. The estimated quantities and the expected quantities are provided to the progress determination module 150 that determines the progress of construction for each object type by comparing the estimated quantity of the object type that has been installed to the expected quantity of the object type that is expected to be installed at the end of construction.

VII. Model Visualization Interface—Examples

FIGS. 3A-3E illustrate portions of the model visualization interface provided by the model visualization module, according to one embodiment. As described above in FIG. 1, the model visualization interface allows a user to view each of the captured images at its corresponding location within a 3D model of the environment.

Figure 3A:
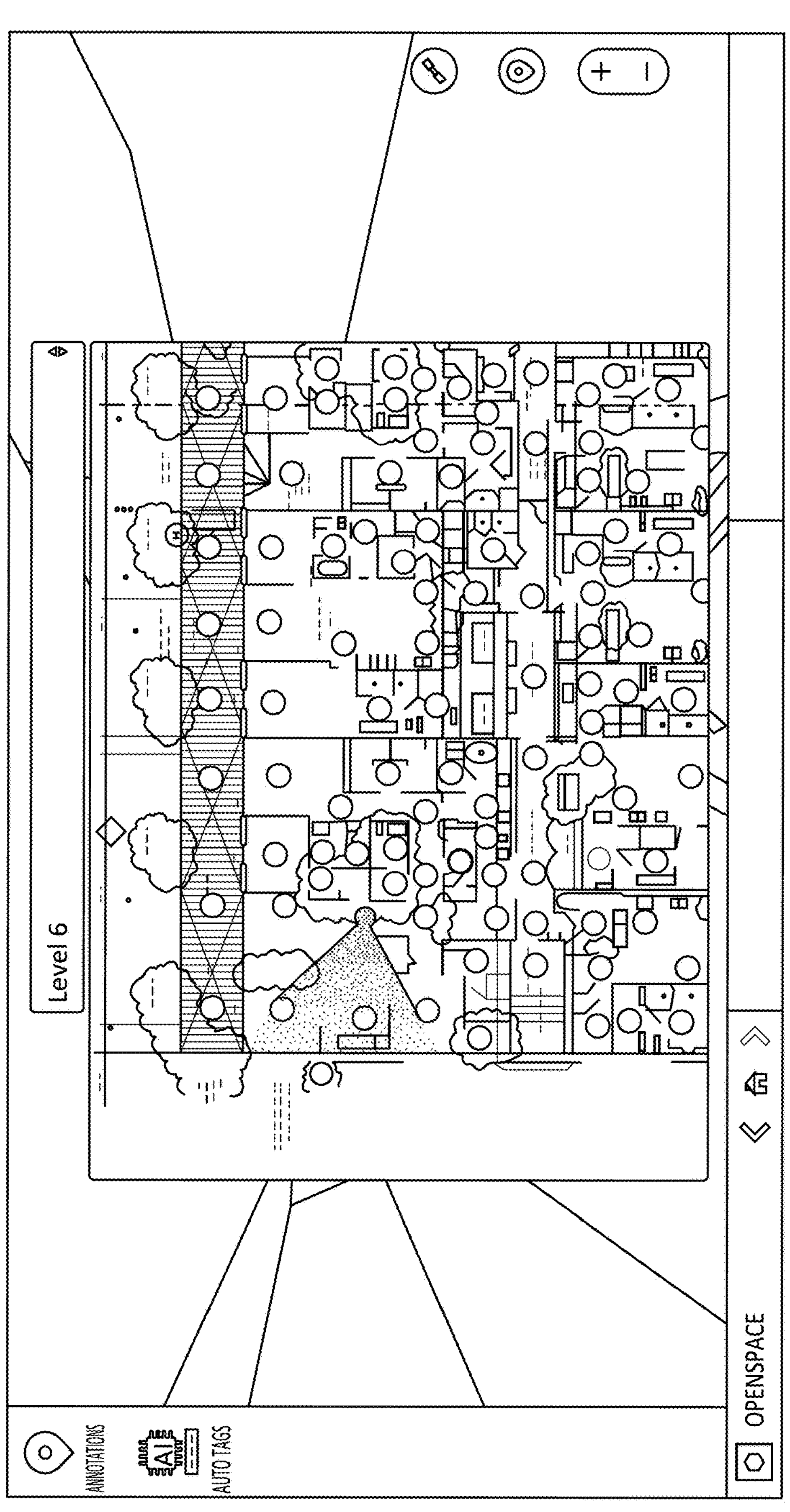
FIGS. 3A-3E illustrate portions of the model visualization interface provided by the model visualization module, according to one embodiment.
Figure 3B:
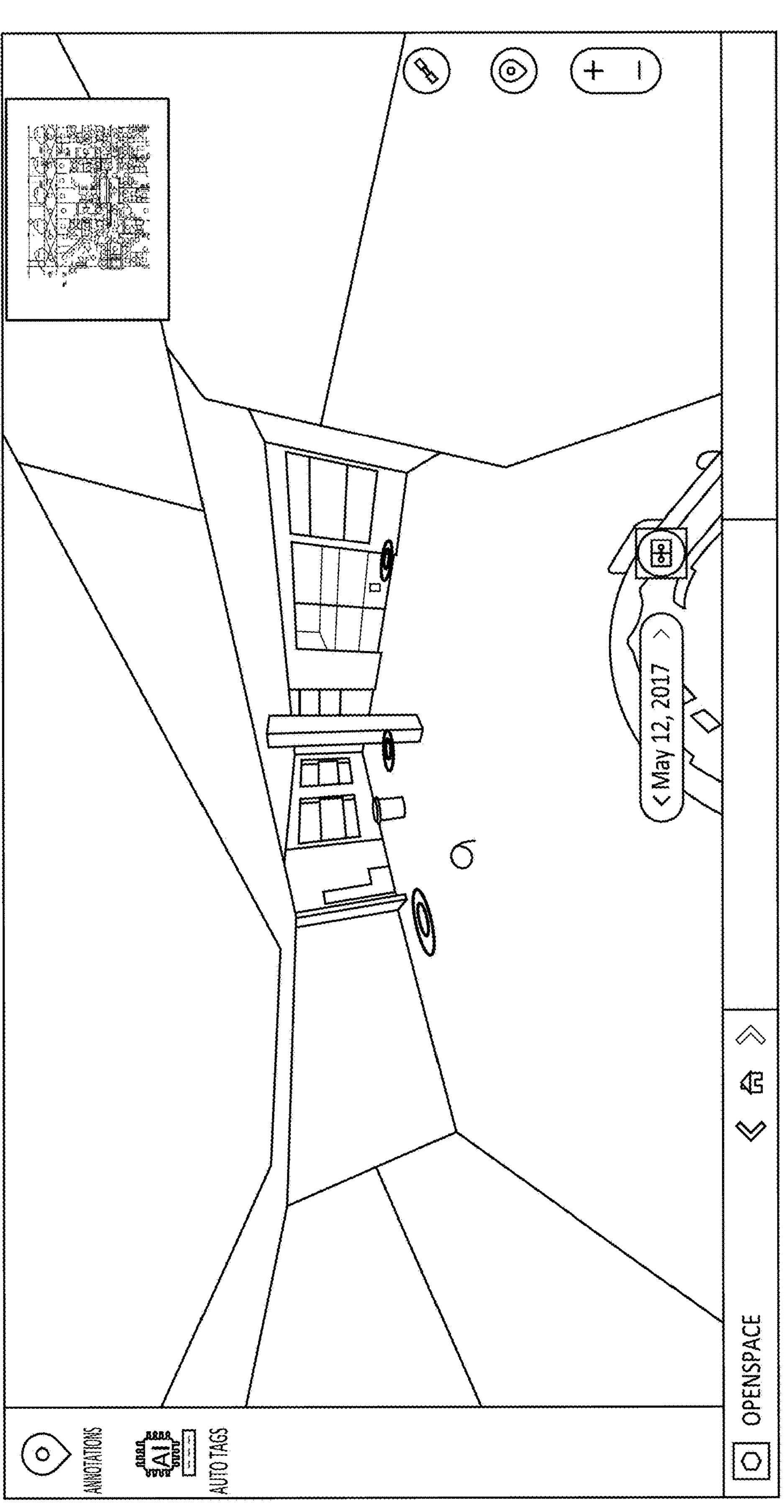

FIGS. 3A-3E continue with the general contracting company example from above. As framing is being completed on a construction site, the general contractor captures a sequence of images inside each unit to create a record of work that will soon be hidden by the installation of drywall. The captured images are provided as input to the camera path module 132, which generates a vector of 6D camera poses (one 6D pose for each image). The 6D camera poses are provided as input to the model visualization module 142, which provides a 2D representation of the relative camera locations associated with each image. The user can view this representation by using a client device 160 to view the visualization interface provided by the model visualization module 142, and the user can navigate to different images in the sequence by selecting icons on a 2D overhead view map. After the user has selected the icon for an image in the 2D overhead map, the visualization interface displays a first-person view of the image that the user can pan and zoom. The first-person view also includes waypoint icons representing the positions of other captured images, and the user can navigate to the first-person view of one of these other images by selecting the waypoint icon for the image. As described above with respect to FIG. 2B, each waypoint icon is rendered based on a route vector that points from the image being displayed to the other image. An example of the 2D overhead view map is shown in FIG. 3A, and an example of a first-person view is shown in FIG. 3B. In the first-person view shown in FIG. 3B, the waypoint icons are blue circles.

Figure 3C:
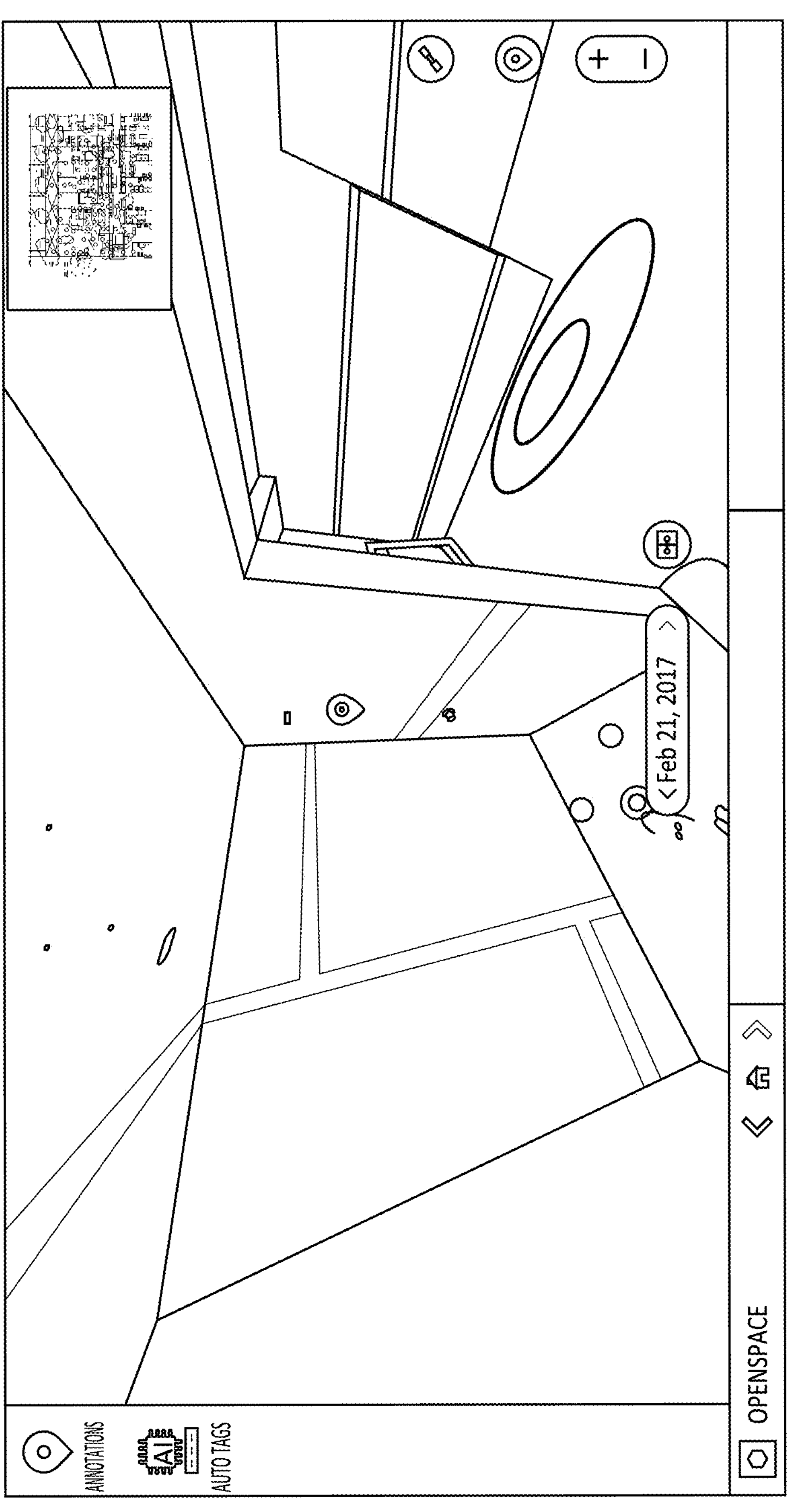

Referring back to the general contracting company example, two months after the images are recorded, a problem is discovered in one of the units that requires the examination of electrical work that is hidden inside one of the walls. Traditionally, examining this electrical work would require tearing down the drywall and other completed finishes in order to expose the work, which is a very costly exercise. However, the general contractor is instead able to access the visualization interface and use the 2D overhead map view to identify the location within the building where the problem was discovered. The general contractor can then click on that location to view an image taken at that location. In this example, the image shown in FIG. 3C is taken at the location where the problem was discovered.

In one embodiment, the visualization interface also includes a split-screen view that displays a first image on one side of the screen and a second image on the other side of the screen. This can be used, for example, to create a side-by-side view of two images that were captured at the same location at different times. These two views can also be synchronized so that adjusting the zoom/orientation in one view adjusts the zoom/orientation in the other view.

Figure 3D:
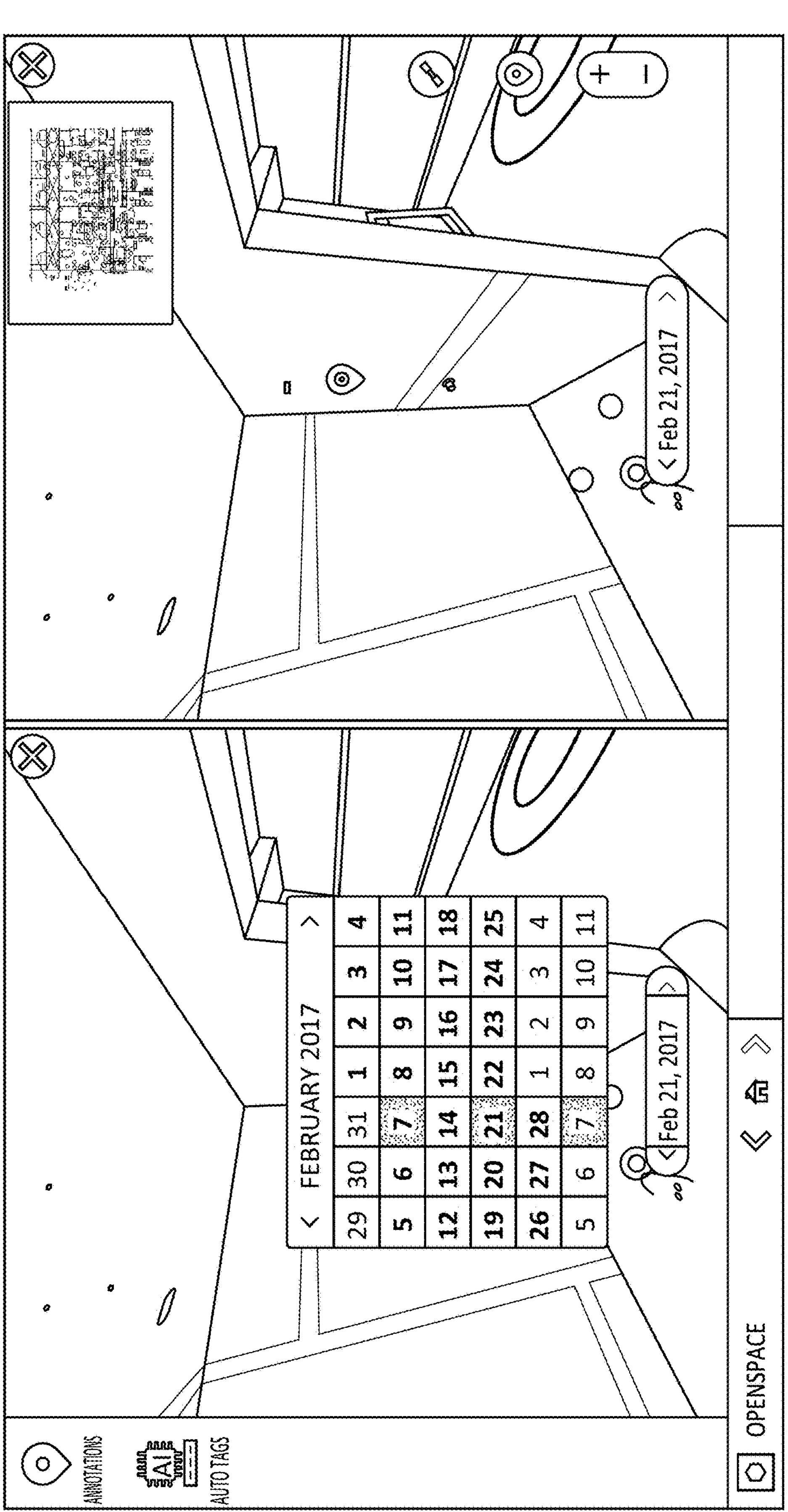
Figure 3E:
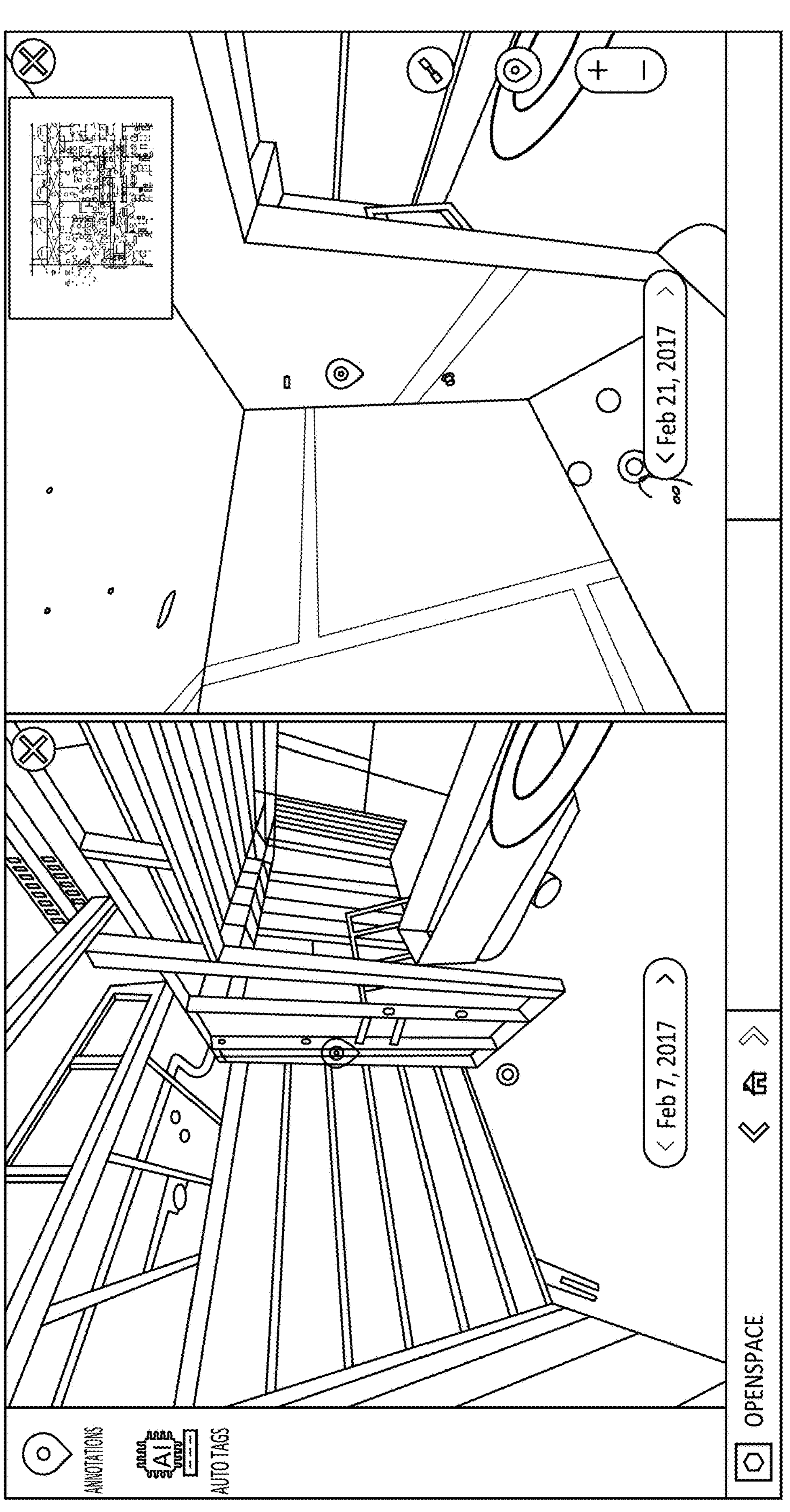

In FIGS. 3D and 3E, the general contractor has used the split-screen view to create a side-by-side view that displays an image from a day after drywall was installed on the right side and an image taken from an earlier date (e.g. the day before drywall was installed) on the left side. By using the visualization interface to "travel back in time" and view the electrical work before it was covered with the drywall, the general contractor can inspect the electrical issues while avoiding the need for costly removal of the drywall. Furthermore, because the spatial indexing system 130 can automatically index the location of every captured image without having a user perform any manual annotation, the process of capturing and indexing the images is less time consuming and can be performed on a regular basis, such as every day or several times per week.

VIII. Progress Visualization Interface—Examples

FIGS. 4A-4E illustrate a progress visualization interface provided by a progress visualization module, according to one embodiment. FIGS. 4A-4E continue with the general contracting company example from above. As work is being done on a project at a construction site, a user captures walkthrough videos of the construction site and provides it to the spatial indexing system 130 to determine how much progress has been made for object types being tracked. The user may capture walkthrough videos periodically (e.g., daily, weekly) and request an analysis of the construction progress over time. The spatial indexing system 130 presents the determined construction progress to the user in the visualization interface 400.

Figure 4A:
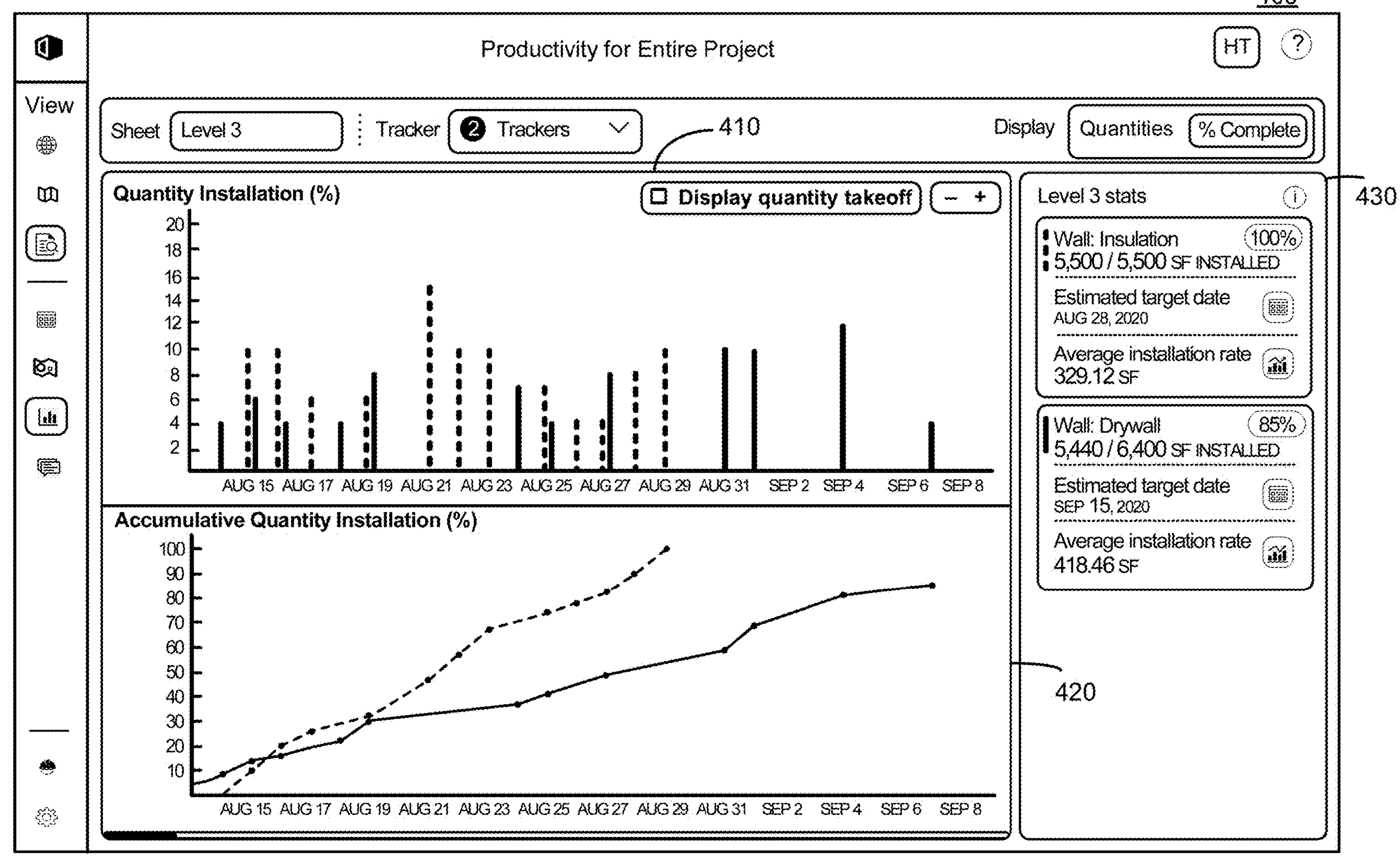

In FIG. 4A, the visualization interface 400 presents construction progress for walls by tracking the installation of insulation and drywall. The visualization interface includes a first interface 410 configured to present quantity of installation that were completed with bar graphs for each of the object types and a second interface 420 configured to present an accumulative quantity of installation monitored over time represented as a line graph. The visualization interface 400 also includes a summary interface 430 that shows the estimated quantity of installation compared to the expected total quantity of installation for each of insulation and drywall. The summary interface 430 also includes an estimated target date for completing installation based on the average installation rate for each object type.

Figure 4B:
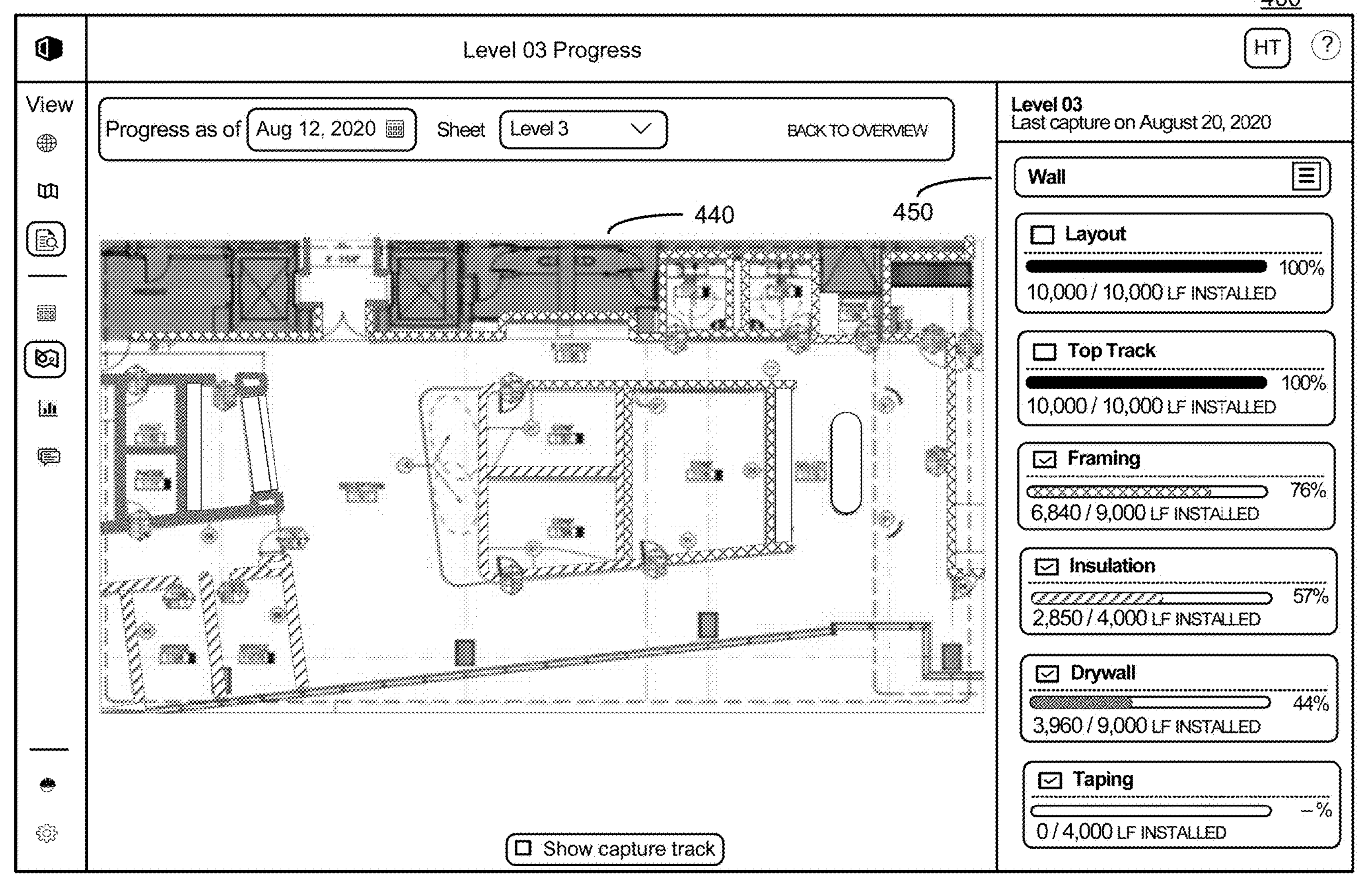

In FIG. 4B, the visualization interface 400 includes a map 440 of the construction site and the construction progress for object types including layout, top track, framing, insulation, drywall, and taping. The map 440 of the construction site may be a top-down view of the annotated 3D model of the environment. The locations of the installed object types are shown in the map 440 and the estimated quantities of the object types that has been installed is shown in a summary 450 at the right side of the visualization interface. In the example illustrated in FIG. 4B, the progress for wall installation is shown, but a user may interact with the visualization interface and request to view progress for other types of tasks such as electrical, flooring, painting, appliances, cabinets, and the like.

Figure 4E:
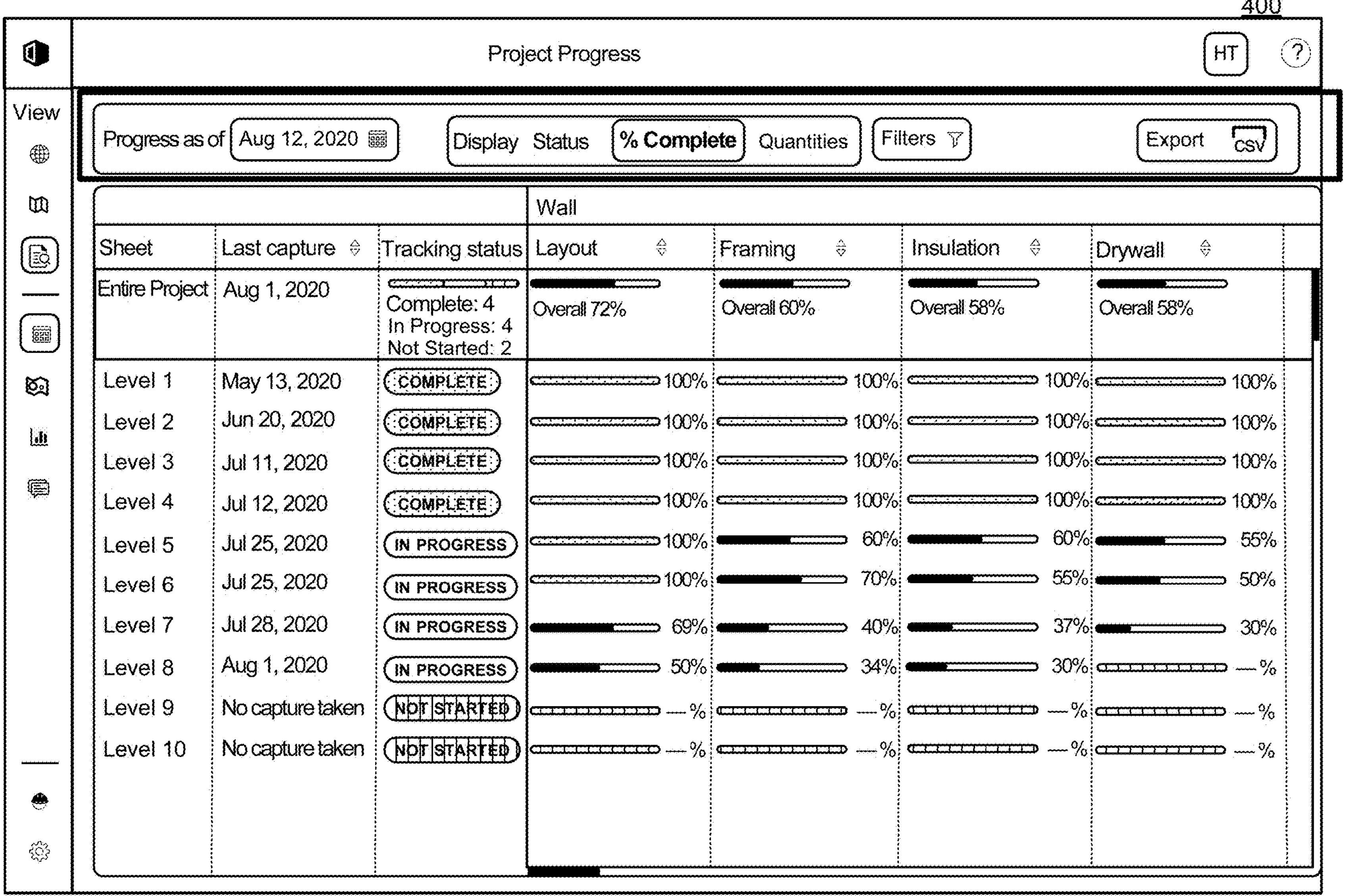

FIGS. 4C-4E are table views of progress of wall installation with different display modes. FIG. 4C is displayed in "quantities" mode, FIG. 4D is displayed in "status" mode, and FIG. 4E is displayed in "% complete" mode. The visualization interface 400 includes a column for "last capture" or last date at which a new walkthrough video was provided, a column for "tracking status" to indicate work is "not started," "in progress," or "completed." The visualization interface 400 also includes a column for tracking the progress of each object type (e.g., layout, framing, insulation, drywall, taping) that goes into building a wall. The visualization interface 400 includes results for each of the levels 1 through 10 of the project as well as an aggregated result for the entire project.

Although not illustrated, the visualization interface 400 may also display a report including expected objects that have not yet been installed. The report may indicate the locations and object types of the missing expected objects. In some embodiments, locations on the map 440 that corresponds to the missing expected objects may be visually distinguished to highlight portions of the construction site that still require work. The report may be updated based on user input (e.g., a user may check off a missing expected object from the report after it has been installed) or when the spatial indexing system 130 performs analysis on a new walkthrough video.

IX. Other Applications of Spatial Indexing

The methods and systems described herein can also be used to in environments other than construction. Automatically counting and measuring objects in the physical world is a core capability that can be applied to a variety of real world use cases. For example, the method can be applied to theft detection to monitor the presence and a quantity of objects expected in hotel rooms after guest checkout. After guests have checked out of a hotel room, a hotel maintenance worker may capture a walkthrough video of the hotel room and use the spatial indexing system to determine if the objects captured in the walkthrough video matches the expected quantities. In another example, the method is used to maintain and manage facilities such as a warehouse or a store to track inventory of a warehouse or a store. A worker or a robot may periodically capture walkthrough videos and determine quantities of object types that are in the warehouse or the store using the spatial indexing system. When the determined quantities are different from the expected quantities, the spatial indexing system may flag the differences for inventory management.

X. Spatial Indexing of Frames Based on Floorplan Features

As noted above, the visualization interface can provide a 2D overhead view map that displays the location of each frame within a floorplan of the environment. In addition to being displayed in the overhead view, the floorplan of the environment can also be used as part of the spatial indexing process that determines the location of each frame.

Figure 5:
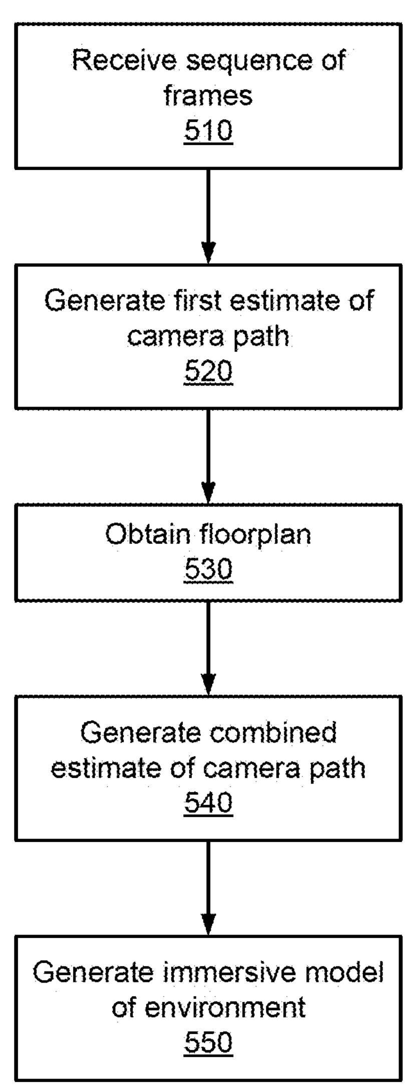
FIG. 5 is a flow chart illustrating an example method for automated spatial indexing of frames using features in a floorplan, according to one embodiment.

FIG. 5 is a flow chart illustrating an example method 500 for automated spatial indexing of frames using features in a floorplan, according to one embodiment. In other embodiments, the method 500 may include additional, fewer, or different steps, and the steps shown in FIG. 5 may be performed in a different order. For instance, the method 400 may be performed without obtaining 530 a floorplan, in which case the combined estimate of the camera path is generated 540 without using features in the floorplan.

The spatial indexing system 130 receives 510 a walkthrough video that is a sequence of frames from a video capture system 110. The image frames in the sequence are captured as the video capture system 110 is moved through an environment (e.g., a floor of a construction site) along a camera path. In one embodiment, each of the image frames is a 360-degree frame that is captured by a 360-degree camera on the video capture system (e.g., the 360-degree camera 112 described above with respect to FIG. 1). In another embodiment, each of the image frames has a narrower field of view, such as 90 degrees.

The spatial indexing system 130 generates 520 a first estimate of the camera path based on the walkthrough video that is a sequence of frames. The first estimate of the camera path can be represented, for example, as a six-dimensional vector that specifies a 6D camera pose for each frame in the sequence. In one embodiment, a component of the spatial indexing system 130 (e.g., the SLAM module 216 described above with reference to FIG. 2A) performs a SLAM algorithm on the walkthrough video that is a sequence of frames to simultaneously determine a 6D camera pose for each frame and generate a three-dimensional virtual model of the environment.

The spatial indexing system 130 obtains 530 a floorplan of the environment. For example, multiple floorplans (including the floorplan for the environment that is depicted in the received walkthrough video that is a sequence of frames) may be stored in the floorplan storage 136, and the spatial indexing system 130 accesses the floorplan storage 136 to obtain the floorplan of the environment. The floorplan of the environment may also be received from a user via the video capture system 110 or a client device 160 without being stored in the floorplan storage 136.

The spatial indexing system 130 generates 540 a combined estimate of the camera path based on the first estimate of the camera path and the physical objects in the floorplan. Two example methods 600, 700 of generating the combined estimate of the camera path 540 are described below with respect to FIGS. 6 and 7, respectively.

After generating 540 the combined estimate of the camera path, the spatial indexing system 130 generates 550 a 3D model of the environment. For example, the model generation module 138 generates the 3D model by combining the floorplan, a plurality of route vectors, the combined estimate of the camera path, and extracted frames from the walkthrough video that is a sequence of frames, as described above with respect to FIG. 2B.

In some embodiments, the spatial indexing system 130 may also receive additional data (apart from the walkthrough video that is a sequence of frames) that was captured while the video capture system is being moved along the camera path. For example, the spatial indexing system also receives motion data or location data as described above with reference to FIG. 1. In embodiments where the spatial indexing system 130 receives additional data, the spatial indexing system 130 may use the additional data in addition with the floorplan when generating 540 the combined estimate of the camera path.

In an embodiment where the spatial indexing system 130 receives motion data along with the walkthrough video that is a sequence of frames, the spatial indexing system 130 can perform a dead reckoning process on the motion data to generate a second estimate of the camera path, as described above with respect to FIG. 2A. In this embodiment, the step of generating 540 the combined estimate of the camera path includes using portions of the second estimate to fill in gaps in the first estimate of the camera path. For example, the first estimate of the camera path may be divided into camera path segments due to poor feature quality in some of the captured frames (which causes gaps where the SLAM algorithm cannot generate a reliable 6D pose, as described above with respect to FIG. 2A). In this case, 6D poses from the second path estimate can be used to join the segments of the first path estimate by filling in the gaps between the segments of the first path estimate.

As noted above, in some embodiments the method 500 may be performed without obtaining 530 a floorplan and the combined estimate of the camera path is generated 540 without using features in the floorplan. In one of these embodiments, the first estimate of the camera path is used as the combined estimate of the camera path without any additional data processing or analysis.

In another one of these embodiments, the combined estimate of the camera path is generated 540 by generating one or more additional estimates of the camera path, calculating a confidence score for each 6D pose in each path estimate, and selecting, for each spatial position along the camera path, the 6D pose with the highest confidence score. For instance, the additional estimates of the camera path may include one or more of: a second estimate using motion data, as described above, a third estimate using data from a GPS receiver, and a fourth estimate using data from an IPS receiver. As described above, each estimate of the camera path is a vector of 6D poses that describe the relative position and orientation for each frame in the sequence.

The confidence scores for the 6D poses are calculated differently for each path estimate. For instance, confidence scores for the path estimates described above may be calculated in the following ways: a confidence score for a 6D pose in the first estimate (generated with a SLAM algorithm) represents the feature quality of the image frame corresponding to the 6D pose (e.g., the number of detected features in the image frame); a confidence score for a 6D pose in the second estimate (generated with motion data) represents a level of noise in the accelerometer, gyroscope, and/or magnetometer data in a time interval centered on, preceding, or subsequent to the time of the 6D pose; a confidence score for a 6D pose in the third estimate (generated with GPS data) represents GPS signal strength for the GPS data used to generate the 6D pose; and a confidence score for a 6D pose in the fourth estimate (generated with IPS data) represents IPS signal strength for the IPS data used to generate the 6D pose (e.g., RF signal strength).

After generating the confidence scores, the spatial indexing system 130 iteratively scans through each estimate of the camera path and selects, for each frame in the sequence, the 6D pose having the highest confidence score, and the selected 6D pose is output as the 6D pose for the image frame in the combined estimate of the camera path. Because the confidence scores for each path estimate are calculated differently, the confidence scores for each path estimate can be normalized to a common scale (e.g., a scalar value between 0 and 1, with 0 representing the lowest possible confidence and 1 representing the highest possible confidence) before the iterative scanning process takes place.

XI. Camera Path Generation-Floorplan Alignment with Brute Force Search

Figure 6:
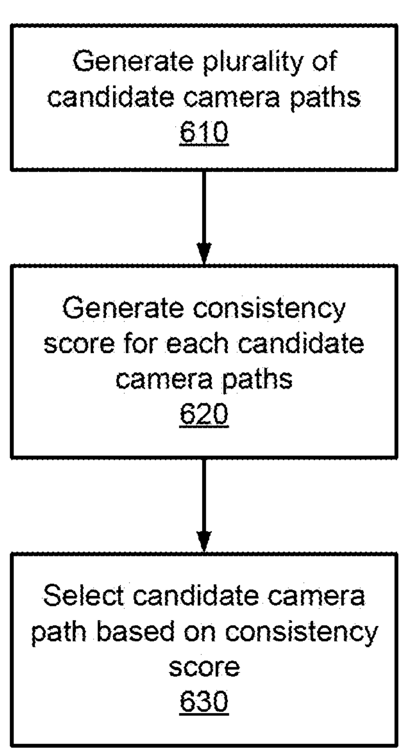
FIG. 6 is a flow chart illustrating an example method for aligning a camera path with a floorplan using a brute force search, according to one embodiment.

FIG. 6 is a flow chart illustrating a method 600 for generating a combined camera path with a floorplan using a brute force search, according to one embodiment. In other embodiments, the method 600 may include additional, fewer, or different steps, and the steps shown in FIG. 6 may be performed in a different order.

The brute force search described in FIG. 6 aligns an estimate of the camera path with a floorplan by generating multiple candidate camera paths (e.g., by applying different scaling, rotation, and translation operations on the camera path estimate) and selecting the candidate camera path that has the highest consistency score relative to the features on the floorplan. As noted above, in some embodiments the first estimate of the camera path can be divided into a plurality of camera path segments (e.g., due to poor feature quality in some of the captured frames). In these embodiments, the brute force search can be performed separately for each of the camera path segments to align each camera path segment with the floorplan. After aligning each of the camera path segments with the floorplan, the spatial indexing system can then use other data, such as motion data, to fill in the gaps in the camera path between the aligned camera path segments. The combination of the aligned camera paths and the filled-in gaps is then output as the combined camera path.

For ease of description, the brute force search is described below with respect to a camera path segment. However, the brute force search can also performed on the entirety of the first path estimate. For example, in some embodiments the first estimate of the camera path is not divided into segments (e.g., because each frame in the sequence of 360-degree frames includes features of sufficiently high quality). In these embodiments, the brute force search described in FIG. 6 is performed on the entirety of the first path estimate to align the first path estimate with the floorplan. In these embodiments, the result of the brute force search is output as the combined path estimate.

The spatial indexing system 130 generates 610 a plurality of candidate camera paths by applying a variety of transformations such as scaling, rotation, and translation operations to the camera path segment.

The spatial indexing system 130 compares each candidate camera path to the features in the floorplan and generates 620 a consistency score for each of the candidate camera paths. The consistency score for a candidate camera path represents the degree of consistency between the candidate camera path and the floorplan.

In one embodiment, the consistency score is a weighted sum of four components. The first component represents the level of similarity between the candidate camera path and the features in the floorplan. For example, the first component can be calculated by generating an intersect score for each instance the candidate camera path intersects a feature in the floorplan, and then combining the intersect scores (e.g., by adding them together). The intersect score represents the likelihood of the real-world camera path passing through the type of feature being intersected (e.g., a high intersect score is generated for intersecting a door, while a low intersect score is generated for intersecting a wall).

The second and third components are based on location data received from the video capture system 110. The second component represents a degree of consistency between the candidate camera path and data from a GPS receiver on the video capture system. For instance, the second component is calculated by combining the distances between a location implied by the candidate camera path and a location specified by the location data at the same point in time. Meanwhile, the third component represents a degree of similarity between the candidate camera path and data from an IPS receiver on the video capture system 110. The third component can be computed in the same manner as the second component. In embodiments where the spatial indexing system 130 does not receive location data from the video capture system 110 (or only receives one type of location data), one or both of these components can be omitted from the consistency score.

The fourth component is generated by comparing features in the captured walkthrough video that is a sequence of frames with features from frames that were previously captured at the same location on the floorplan. In an embodiment where the consistency score includes the fourth component, the spatial indexing system 130 stores previously captured frames in association with their floorplan locations (e.g., as part of one of the models in the model storage 140).

After generating the consistency scores for the candidate camera paths, the spatial indexing system 530 selects one candidate camera path based on the consistency scores. For example, the spatial indexing system 630 selects the candidate camera path with the highest consistency score.

X. Camera Path Generation-Floorplan Alignment with Grid Map

Figure 7A:
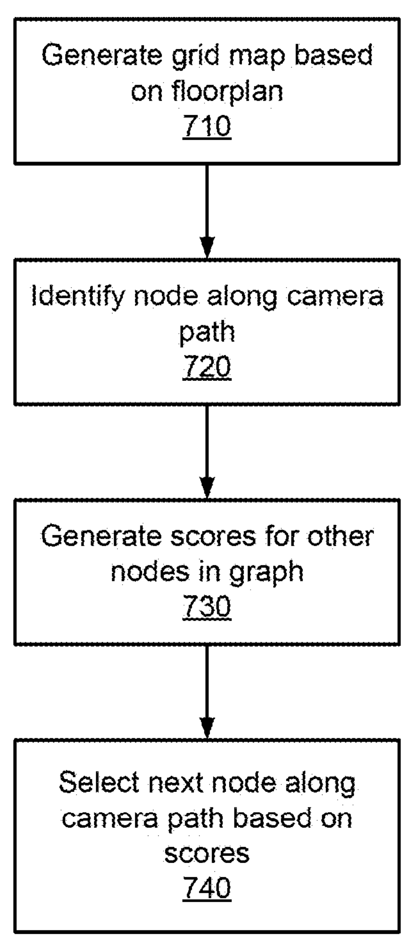
FIG. 7A is a flow chart illustrating an example method for aligning a camera path with a floorplan using a grid map of a floorplan, according to one embodiment.

FIG. 7A is a flow chart illustrating an example method 700 for generating a combined camera path using a grid map of a floorplan, according to one embodiment. In other embodiments, the method 700 may include additional, fewer, or different steps, and the steps shown in FIG. 7A may be performed in a different order.

The spatial indexing system 130 generates 710 a grid map based on the floorplan. The grid map is a graph in which each node represents a spatial position on the floorplan, and each edge between two nodes specifies a transition score that represents the traversability of the space between the two nodes. The transition score for an edge is determined based on the presence of features between the two nodes. For example, if a wall is present between the two nodes, then the transition score for the edges between those two nodes is lower to indicate that the camera path is unlikely to cross between the two nodes. In contrast, if a door is present between two nodes, then the transition score for the edge between the two nodes is higher.

In one embodiment, the weights for edges that pass through walls are adjusted over time. For example, at a first time (e.g., at an early stage in construction when the framing for the walls is not yet in place), the weights for these edges are assigned the same value as the weights for edges that pass through empty space inside a room. At a second time (e.g., at an intermediate stage in construction when the framing has been constructed, but the drywall is not yet in place), the weights for these edges are assigned a reduced value to indicate that physically passing through the wall is possible but not common. At a third time (e.g., at a later stage in construction when both the framing and the drywall are in place), the weights for these edges are assigned a low value to indicate that passing through the wall is physically impossible. The times corresponding to the first time, the second time, and the third time may be received as user input from a client device 160, determined based on a construction schedule provided to the spatial indexing system 130, or by performing feature recognition on some or all of the image frames in the sequence to determine the construction progress on the walls.

In one embodiment, the presence of a floorplan feature (such as a wall or a door) between two nodes is detected using a computer vision feature classifier. In this embodiment, the feature classifier extracts frame features (e.g., SIFT SURG, or ORB features) from a frame of the floorplan and uses the image frame features to classify different features (e.g., walls and doors) that appear at various positions in the floorplan. The feature classifier can be trained, for example, using training data that includes a plurality of manually annotated floorplans. In other embodiments, the presence of a feature between two nodes can be detected manually (e.g., by user input) or by using metadata within the floorplan.

Figure 7B:
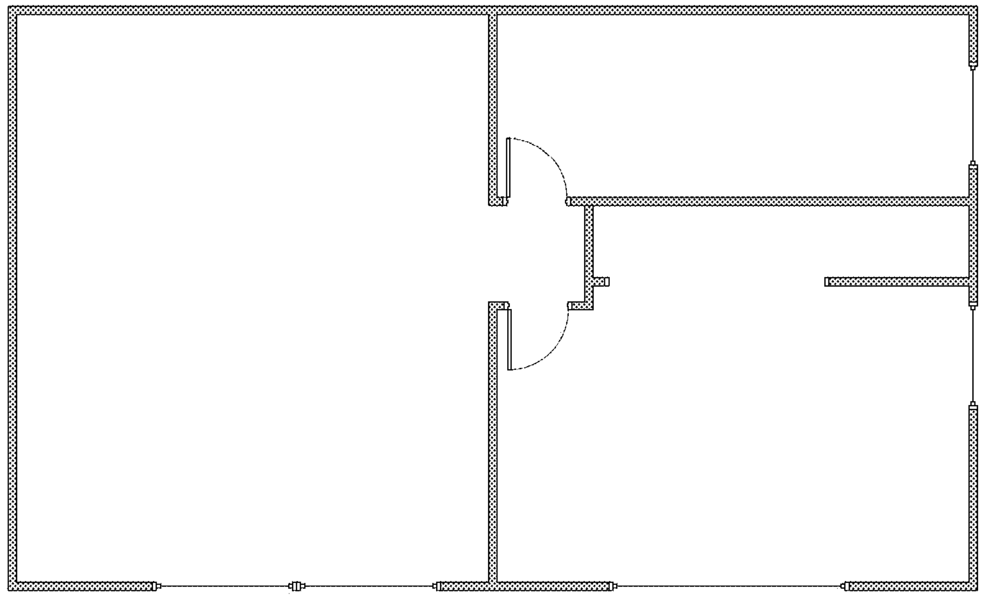
FIG. 7B illustrates an example of a floorplan, according to one embodiment.
Figure 7C:
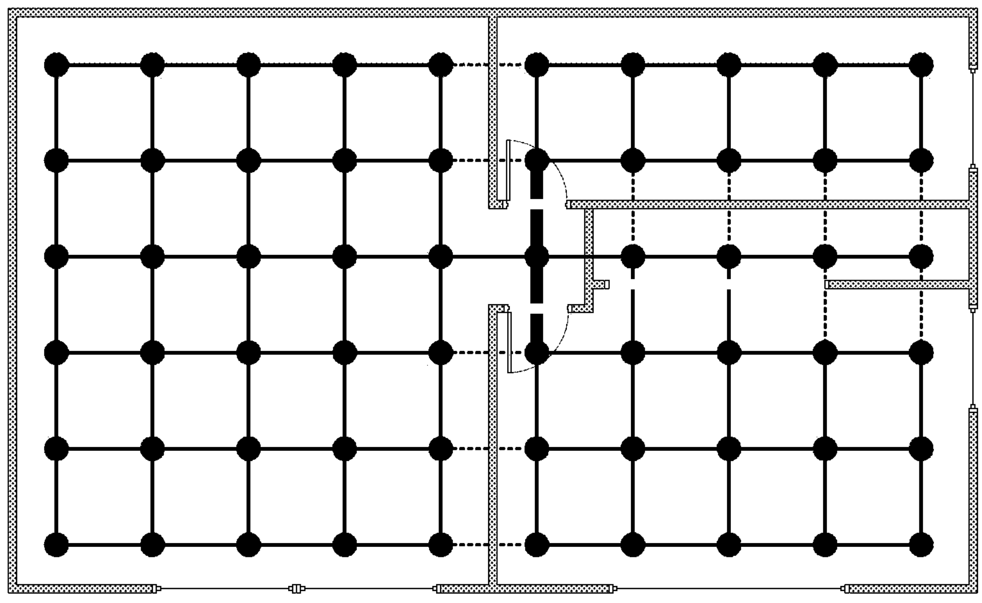
FIG. 7C illustrates an example of a grip map, according to one embodiment.

FIG. 7B illustrates an example of a floorplan, and FIG. 7C illustrates an example of a grip map that is generated for the floorplan. In the example grid map shown in FIG. 7C, the nodes are equally spaced in both the horizontal and vertical directions so that the nodes and edges for a two-dimensional grid of squares. Edges having a lower transition score are illustrated in FIG. 7C with dotted lines, and edges having a higher transition score are illustrated with thicker lines. As shown in FIG. 7C, the edges that cross the walls have a lower transition score, while the edges that pass through the two doors have a higher transition score.

After generating 710 the grid map, the spatial indexing system 130 performs an iterative Map Matching algorithm to match the first estimate of the camera path to the grid map. The Map Matching algorithm can be, for example, a Hidden Markov Model (HMM), a conditional random field (CRF), or some other type of Map Matching algorithm.

In the embodiment shown in FIG. 7A, the spatial indexing system 130 performs Map Matching by performing a Markov process to iteratively identify nodes along a path through the grid map that match the first estimate of the camera path.

An iteration of the Markov process begins by identifying 720 one node along the camera path. When the process is initiated, the first node that is identified is the starting point of the camera path. The starting point may be provided as user input or determined based on location data (e.g., GPS or IPS data) received from the video capture system 110.

Once a node has been identified, the spatial indexing system 130 generates 730 scores for a plurality of the other nodes in the grid map. In one embodiment, the spatial indexing system 130 scores every other node in the graph apart from the identified node. In other embodiments, the spatial indexing system 130 scores a subset of the other nodes in the graph. For example, the spatial indexing system 130 scores each node that is separated from the identified node by less than a threshold number of edges (i.e., the spatial indexing system 130 scores the nodes that are close to the identified node). This may be useful, for example, when the grid map includes a large number of nodes and edges and it would be too computationally intensive to score each of the other nodes.

The scores are generated 730 based on the transition scores for the edges between the identified node and the other node. The score is further based on the direction of the first estimate of the camera path near the identified node. For instance, if the first estimate of the camera path travels to the left near the identified node, then a higher score is generated for the edge connecting the identified node to the adjacent node on its left, while lower scores are generated for the edges connecting the identified node to the adjacent nodes above, below, and to the right. The score is also based on the distance traveled by the first estimate of the camera path near the identified node. For example, if the next 6D pose vector on the camera path is 4 feet away, and adjacent nodes in the grid map are separate by a distance of 2 feet, then nodes that are separated from the identified node by two edges are assigned a higher score.

The spatial indexing system 130 uses the scores for each of the other nodes to select 740 one of other nodes as the next nodes along the camera path. The selected node is designated as the new identified node, and the steps of generating 730 scores for other nodes and selecting 740 the next node in the camera path are repeated until nodes along the entire camera path have been identified. The spatial indexing system 130 can then perform a Viterbi algorithm to identify the most likely path through the grid map based on the identified nodes. The identified path can then be provided as the output of the step of generating 440 the combined estimate of the camera path.

XII. Progress Tracking

FIG. 8 is a flow chart illustrating an example method for progress tracking using walkthrough videos, according to one embodiment. A spatial indexing system accesses 810 a floorplan of a portion of a building, the floorplan identifying locations of one or more expected objects within the portion of the building. For each object type of a plurality of object types being tracked, the spatial indexing system determines 820 one or more expected objects of the object type in the building based on the accessed floorplan. The spatial indexing system receives 830 a video comprising a plurality of image frames from a camera system, where the video is captured as the camera system is moved through the portion of the building. The spatial indexing system identifies 840 one or more objects in the plurality of image frames, where each of the one or more objects is associated with an object type and a location within the portion of the building where the object is disposed. The spatial indexing system generates 850 a 3D model of the portion of the building from the plurality of image frames. For each of the one or more identified objects, the spatial indexing system modifies 860 a region of the 3D model corresponding to the location within the portion of the building where the identified object is disposed to include the identified object. For each object type, the spatial indexing system determines 870 a probability of the identified object being present at the location within the portion of the building based on the modified 3D model and the accessed floorplan. For each object type, the spatial indexing system determines 880 a difference between the one or more expected objects and one or more identified objects associated with a probability greater than a predetermined threshold. For each object type, the spatial indexing system modifies 890 an interface to present the determined difference.

XIII. Hardware Components

Figure 9:
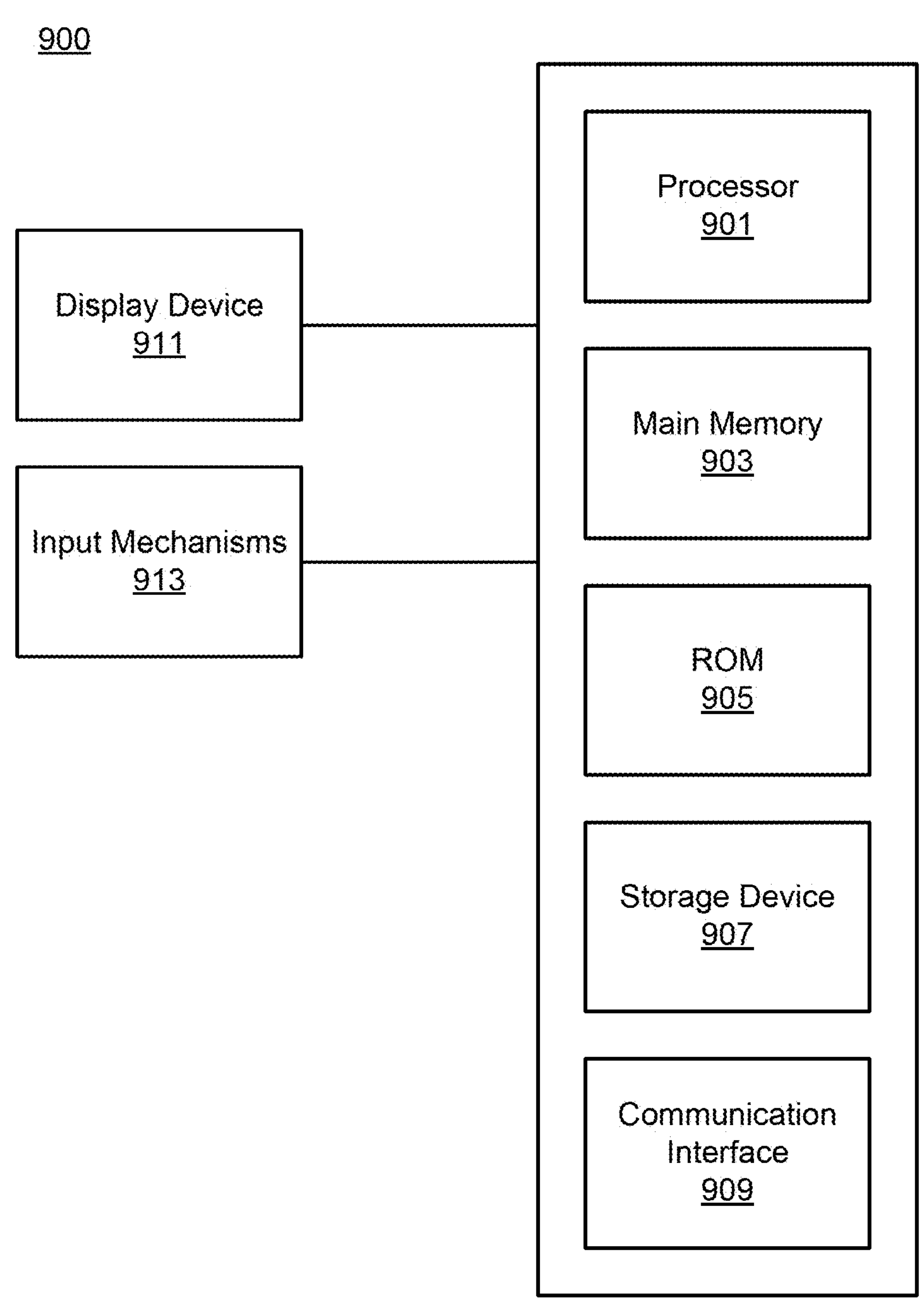
FIG. 9 is a flow chart illustrating an example method for an object search in walkthrough videos, according to one embodiment.

FIG. 9 is a block diagram illustrating a computer system 900 upon which embodiments described herein may be implemented. For example, in the context of FIG. 1, the video capture system 110, the spatial indexing system 130, and the client device 160 may be implemented using the computer system 900 as described in FIG. 9. The video capture system 110, the spatial indexing system 130, or the client device 160 may also be implemented using a combination of multiple computer systems 900 as described in FIG. 9. The computer system 900 may be, for example, a laptop computer, a desktop computer, a tablet computer, or a smartphone.

In one implementation, the system 900 includes processing resources 901, main memory 903, read only memory (ROM) 905, storage device 907, and a communication interface 909. The system 900 includes at least one processor 901 for processing information and a main memory 903, such as a random access memory (RAM) or other dynamic storage device, for storing information and instructions to be executed by the processor 901. Main memory 903 also may be used for storing temporary variables or other intermediate information during execution of instructions to be executed by processor 901. The system 900 may also include ROM 905 or other static storage device for storing static information and instructions for processor 901. The storage device 907, such as a magnetic disk or optical disk, is provided for storing information and instructions.

The communication interface 909 can enable system 900 to communicate with one or more networks (e.g., the network 140) through use of the network link (wireless or wireline). Using the network link, the system 900 can communicate with one or more computing devices, and one or more servers. The system 900 can also include a display device 911, such as a cathode ray tube (CRT), an LCD monitor, or a television set, for example, for displaying graphics and information to a user. An input mechanism 913, such as a keyboard that includes alphanumeric keys and other keys, can be coupled to the system 900 for communicating information and command selections to processor 901. Other non-limiting, illustrative examples of input mechanisms 913 include a mouse, a trackball, touch-sensitive screen, or cursor direction keys for communicating direction information and command selections to processor 901 and for controlling cursor movement on display device 911. Additional examples of input mechanisms 913 include a radio-frequency identification (RFID) reader, a barcode reader, a three-dimensional scanner, and a three-dimensional camera.

According to one embodiment, the techniques described herein are performed by the system 900 in response to processor 901 executing one or more sequences of one or more instructions contained in main memory 903. Such instructions may be read into main memory 903 from another machine-readable medium, such as storage device 907. Execution of the sequences of instructions contained in main memory 903 causes processor 901 to perform the process steps described herein. In alternative implementations, hard-wired circuitry may be used in place of or in combination with software instructions to implement examples described herein. Thus, the examples described are not limited to any specific combination of hardware circuitry and software.

XIV. Additional Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:

receiving, from a camera system, a video comprising a plurality of image frames captured as the camera system is moved through a portion of a building;

identifying one or more objects in the plurality of image frames at one or more locations within the portion of the building by applying, for each image frame, a machine learning model to the image frame configured to classify pixels in the image frame as one or more objects and to determine the location for each object; and modifying an interface to include a difference between an identified object and an object expected at a location within the portion of the building, the identified object and the expected object having a same object type.

2. The method of claim 1, further comprising:

accessing a model of the portion of the building, the model indicating locations of one or more expected objects within the portion of the building, wherein the accessed model comprises one or more of: a 2D model, a floor plan, a 3D model, a point cloud, a lidar-generated model, and a SLAM model.

3. The method of claim 2, wherein each of the objects is associated with the object type, and wherein determining a count difference between a number of the one or more expected objects from the accessed model and a number of one or more objects identified in the plurality of image frames at a location comprises determining, for each object type, a count difference between a number of the one or more expected objects of the object type from the accessed model and a number of one or more objects of the object type identified in the plurality of image frames.

4. The method of claim 3, wherein presenting the determined count differences within the interface comprises including each count difference within a 2D representation of the portion of the building at a location within the 2D representation corresponding to the location of the count difference.

5. The method of claim 3, wherein presenting the determined count differences within the interface comprises including a count difference within a 3D representing of a location within the portion of the building corresponding to the location of the count difference.

6. The method of claim 3, wherein at least one count difference comprises a count difference for all objects of an object type within the portion of the building.

7. A non-transitory computer-readable storage medium storing executable instructions that, when executed by a hardware processor, cause the hardware process to perform steps comprising:

receiving, from a camera system, a video comprising a plurality of image frames captured as the camera system is moved through a portion of a building;

identifying one or more objects in the plurality of image at one or more locations within the portion of the building by applying, for each image frame, a machine learning model to the image frame configured to classify pixels in the image frame as one or more objects and to determine the location for each object; and modifying an interface to include a difference between an identified object and an object expected at a location within the portion of the building, the identified object and the expected object having a same object type.

8. The non-transitory computer-readable storage medium of claim 7, wherein the steps further comprise:

accessing a model of the portion of the building, the model indicating locations of one or more expected objects within the portion of the building, the accessed model comprises one or more of: a 2D model, a floor plan, a 3D model, a point cloud, a lidar-generated model, and a SLAM model.

9. The non-transitory computer-readable storage medium of claim 8, wherein each of the objects is associated with the object type, and wherein determining a count difference between a number of the one or more expected objects from the accessed model and a number of one or more objects identified in the plurality of image frames at a location comprises determining, for each object type, a count difference between a number of the one or more expected objects of the object type from the accessed model and a number of one or more objects of the object type identified in the plurality of image frames.

10. The non-transitory computer-readable storage medium of claim 9, wherein presenting the determined count differences within the interface comprises including each count difference within a 2D representation of the portion of the building at a location within the 2D representation corresponding to the location of the count difference.

11. The non-transitory computer-readable storage medium of claim 9, wherein presenting the determined count differences within the interface comprises including a count difference within a 3D representing of a location within the portion of the building corresponding to the location of the count difference.

12. The non-transitory computer-readable storage medium of claim 9, wherein at least one count difference comprises a count difference for all objects of an object type within the portion of the building.

13. A system comprising:

a hardware processor; and a non-transitory computer-readable storage medium storing executable instructions that, when executed by the hardware processor, cause the hardware processor to perform steps comprising:

receiving, from a camera system, a video comprising a plurality of image frames captured as the camera system is moved through a portion of a building;

identifying one or more objects in the plurality of image frames at one or more locations within the portion of the building by applying, for each image frame, a machine learning model to the image frame configured to classify pixels in the image frame as one or more objects and to determine the location for each object; and modifying an interface to include a difference between an identified object and an object expected at a location within the portion of the building, the identified object and the expected object having a same object type.

14. The system of claim 13, wherein the steps further comprise:

accessing a model of the portion of the building, the model indicating locations of one or more expected objects within the portion of the building, wherein the accessed model comprises one or more of: a 2D model, a floor plan, a 3D model, a point cloud, a lidar-generated model, and a SLAM model.

15. The system of claim 14, wherein each of the objects is associated with the object type, and wherein determining a count difference between a number of the one or more expected objects from the accessed model and a number of one or more objects identified in the plurality of image frames at a location comprises determining, for each object type, a count difference between a number of the one or more expected objects of the object type from the accessed model and a number of one or more objects of the object type identified in the plurality of image frames.

16. The system of claim 15, wherein presenting the determined count differences within the interface comprises including each count difference within a 2D representation of the portion of the building at a location within the 2D representation corresponding to the location of the count difference.

17. The system of claim 15, wherein presenting the determined count differences within the interface comprises including a count difference within a 3D representing of a location within the portion of the building corresponding to the location of the count difference.

* * * * *